US011950055B2

(12) United States Patent
Zhang et al.

(10) Patent No.: US 11,950,055 B2
(45) **Date of Patent: *Apr. 2, 2024**

(54) SYSTEMS AND METHODS FOR SUPPRESSING SOUND LEAKAGE

(71) Applicant: SHENZHEN SHOKZ CO., LTD., Guangdong (CN)

(72) Inventors: Lei Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 471 days.

This patent is subject to a terminal disclaimer.

(21) Appl. No.: 17/219,871

(22) Filed: Mar. 31, 2021

(65) Prior Publication Data

US 2021/0219070 A1 Jul. 15, 2021

Related U.S. Application Data

(63) Continuation-in-part of application No. 17/074,762, filed on Oct. 20, 2020, now Pat. No. 11,197,106, (Continued)

(30) Foreign Application Priority Data

Jan. 6, 2014 (CN) ........................ 201410005804.0

(51) Int. Cl.

*G10K 9/13* (2006.01)
*G10K 9/22* (2006.01)
(Continued)

(52) U.S. Cl.

CPC ............ *H04R 25/505* (2013.01); *G10K 9/13* (2013.01); *G10K 9/22* (2013.01); *G10K 11/175* (2013.01);
(Continued)

(58) Field of Classification Search

CPC .... H04R 25/505; H04R 1/2811; H04R 9/066; H04R 1/2876; H04R 17/00;
(Continued)

(56) References Cited

U.S. PATENT DOCUMENTS 2,327,320 A 8/1943 Shapiro
4,442,323 A 4/1984 Yoshida et al.
(Continued)

FOREIGN PATENT DOCUMENTS

CN 1898939 A 1/2007
CN 101496419 A 7/2009
(Continued)

OTHER PUBLICATIONS

Notice of Reasons for Rejection in Japanese Application No. 2020560320 dated Dec. 20, 2021, 25 pages.
(Continued)

*Primary Examiner* — Carolyn R Edwards
*Assistant Examiner* — Friedrich Fahnert
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in a target region. The interference at a specific frequency relates to a distance between the at least one sound guiding hole and the portion of the housing.

20 Claims, 33 Drawing Sheets

Related U.S. Application Data which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978, application No. 17/219,871 is a continuation-in-part of application No. 17/169,816, filed on Feb. 8, 2021, which is a continuation of application No. 17/079,438, filed on Oct. 24, 2020, which is a continuation of application No. PCT/CN2018/084588, filed on Apr. 26, 2018.

(51) Int. Cl.

| | |
|---|---|
| ***G10K 11/175*** | (2006.01) |
| ***G10K 11/178*** | (2006.01) |
| ***G10K 11/26*** | (2006.01) |
| ***H04R 1/28*** | (2006.01) |
| ***H04R 9/06*** | (2006.01) |
| ***H04R 17/00*** | (2006.01) |
| ***H04R 25/00*** | (2006.01) |

(52) U.S. Cl.
CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search
CPC .......... H04R 2460/13; H04R 2201/003; H04R 1/2884; H04R 9/025; H04R 19/005; H04R 19/04; H04R 25/48; H04R 25/606; H04R 25/609; H04R 25/65; H04R 2410/05; H04R 2460/01; G10K 9/13; G10K 9/22; G10K 11/175; G10K 11/178; G10K 11/26; G10K 2210/3216; G10K 11/17827; G10K 11/17857; G10K 11/17873
USPC .......................................................... 381/151
See application file for complete search history.

(56) References Cited

U.S. PATENT DOCUMENTS

| | | | | |
|---|---|---|---|---|
| 4,987,597 | A | 1/1991 | Haertl | |
| 5,363,452 | A | 11/1994 | Anderson | |
| 5,430,803 | A | 7/1995 | Kimura et al. | |
| 5,692,059 | A | 11/1997 | Kruger | |
| 5,757,935 | A | 5/1998 | Kang et al. | |
| 5,790,684 | A | 8/1998 | Niino et al. | |
| 6,850,138 | B1 | 2/2005 | Sakai | |
| 7,146,014 | B2 | 12/2006 | Hannah | |
| 8,141,678 | B2 | 3/2012 | Ikeyama et al. | |
| 9,226,075 | B2 | 12/2015 | Lee | |
| 9,729,978 | B2 | 8/2017 | Qi et al. | |
| 10,149,071 | B2 | 12/2018 | Qi et al. | |
| 10,334,372 | B2 | 6/2019 | Qi et al. | |
| 10,616,696 | B2 | 4/2020 | Qi et al. | |
| 10,631,075 | B1 | 4/2020 | Patil et al. | |
| 10,897,677 | B2 | 1/2021 | Walraevens et al. | |
| 11,197,106 | B2 | 12/2021 | Qi et al. | |
| 2003/0048913 | A1 | 3/2003 | Lee et al. | |
| 2003/0085070 | A1 | 5/2003 | Wickstrom | |
| 2004/0131219 | A1* | 7/2004 | Polk, Jr. ............... H04R 1/2826 | 381/345 |
| 2005/0063553 | A1 | 3/2005 | Ozawa | |
| 2005/0234715 | A1 | 10/2005 | Ozawa | |
| 2005/0251952 | A1* | 11/2005 | Johnson .................... B08B 5/02 | 15/363 |
| 2006/0098829 | A1 | 5/2006 | Kobayashi | |
| 2007/0041588 | A1 | 2/2007 | Lin | |
| 2007/0041595 | A1 | 2/2007 | Carazo et al. | |
| 2007/0047744 | A1 | 3/2007 | Harney et al. | |
| 2009/0095613 | A1 | 4/2009 | Lin | |
| 2009/0112051 | A1 | 4/2009 | Miller, III | |
| 2009/0141920 | A1 | 6/2009 | Suyama | |
| 2009/0175477 | A1 | 7/2009 | Suzuki et al. | |
| 2009/0208031 | A1 | 8/2009 | Abolfathi | |
| 2009/0285417 | A1 | 11/2009 | Shin et al. | |
| 2009/0290730 | A1 | 11/2009 | Fukuda et al. | |
| 2010/0054492 | A1 | 3/2010 | Eaton et al. | |
| 2010/0322454 | A1 | 12/2010 | Ambrose et al. | |
| 2011/0150262 | A1 | 6/2011 | Nakama et al. | |
| 2011/0179876 | A1 | 7/2011 | Kasai et al. | |
| 2012/0020501 | A1 | 1/2012 | Lee | |
| 2012/0070022 | A1 | 3/2012 | Saiki | |
| 2012/0076322 | A1 | 3/2012 | Kimura et al. | |
| 2012/0177206 | A1 | 7/2012 | Yamagishi et al. | |
| 2012/0224723 | A1 | 9/2012 | Akino | |
| 2013/0018218 | A1 | 1/2013 | Haller et al. | |
| 2013/0208923 | A1 | 8/2013 | Suvanto | |
| 2013/0329919 | A1 | 12/2013 | He | |
| 2014/0009008 | A1 | 1/2014 | Li et al. | |
| 2014/0064533 | A1 | 3/2014 | Kasic, II | |
| 2014/0185822 | A1 | 7/2014 | Kunimoto et al. | |
| 2014/0185837 | A1 | 7/2014 | Kunimoto et al. | |
| 2014/0274229 | A1 | 9/2014 | Fukuda | |
| 2015/0030189 | A1 | 1/2015 | Nabata et al. | |
| 2015/0256656 | A1 | 9/2015 | Hori | |
| 2015/0264473 | A1 | 9/2015 | Fukuda | |
| 2015/0326967 | A1 | 11/2015 | Otani | |
| 2016/0037243 | A1 | 2/2016 | Lippert et al. | |
| 2016/0050499 | A1 | 2/2016 | Bolognia et al. | |
| 2016/0150337 | A1* | 5/2016 | Nandy ................ G10L 21/0208 | 381/66 |
| 2016/0165357 | A1* | 6/2016 | Morishita ............. H04R 19/04 | 381/170 |
| 2016/0295328 | A1* | 10/2016 | Park ....................... H04R 19/04 | |
| 2017/0061953 | A1 | 3/2017 | An et al. | |
| 2017/0111734 | A1 | 4/2017 | Macours | |
| 2017/0201823 | A1 | 7/2017 | Shetye et al. | |
| 2017/0223445 | A1 | 8/2017 | Bullen et al. | |
| 2018/0077507 | A1 | 3/2018 | Bernal Castillo et al. | |
| 2018/0167710 | A1 | 6/2018 | Silver et al. | |
| 2018/0182370 | A1 | 6/2018 | Hyde et al. | |
| 2019/0052954 | A1 | 2/2019 | Rusconi Clerici Beltrami et al. | |
| 2019/0238971 | A1 | 8/2019 | Wakeland et al. | |
| 2020/0286462 | A1 | 9/2020 | Nielsen | |
| 2020/0367008 | A1 | 11/2020 | Walsh et al. | |
| 2021/0099027 | A1 | 4/2021 | Larsson et al. | |
| 2021/0219059 | A1 | 7/2021 | Qi et al. | |
| 2021/0281954 | A1 | 9/2021 | Qi et al. | |

FOREIGN PATENT DOCUMENTS

| | | | |
|---|---|---|---|
| CN | 201616895 | U | 10/2010 |
| CN | 201690580 | U | 12/2010 |
| CN | 102014328 | A | 4/2011 |
| CN | 102314871 | A | 1/2012 |
| CN | 102421043 | A | 4/2012 |
| CN | 202435600 | U | 9/2012 |
| CN | 103167390 | A | 6/2013 |
| CN | 103347235 | A | 10/2013 |
| CN | 203840513 | U | 9/2014 |
| CN | 204206450 | U | 3/2015 |
| CN | 204836575 | U | 12/2015 |
| DE | 3921784 | A1 | 1/1991 |
| EP | 2011367 | B1 | 12/2014 |
| JP | 3045202 | U | 1/1998 |
| JP | 2006332715 | A | 12/2006 |
| JP | 2007174165 | A | 7/2007 |

(56) References Cited

FOREIGN PATENT DOCUMENTS

| | | | |
|---|---|---|---|
| JP | 2007251358 | A | 9/2007 |
| JP | 2010114878 | A | 5/2010 |
| JP | 2011176533 | A | 9/2011 |
| KR | 20050030183 | A | 3/2005 |
| KR | 20090082999 | A | 8/2009 |
| WO | 9522878 | A2 | 8/1995 |
| WO | 2004095878 | A2 | 11/2004 |
| WO | 2012025794 | A1 | 3/2012 |
| WO | 2013084595 | A1 | 6/2013 |
| WO | 2013153828 | A1 | 10/2013 |
| WO | 2015142893 | A1 | 9/2015 |

OTHER PUBLICATIONS

Decision on Grant in Russian Application No. 2021134604 dated Sep. 23, 2022, 16 pages.
The Office Action in Russian Application No. 2020137933 dated Jun. 10, 2021, 18 pages.
Notice of Preliminary Rejection in Korean Application No. 10-2022-7010046 dated Jun. 20, 2022, 15 pages.
Notice of Reasons for Rejection in Japanese Application No. 2022045315 dated Mar. 6, 2023, 14 pages.
International Search Report in PCT/CN2014/094065 dated Mar. 17, 2015, 5 pages.
Written Opinion in PCT/CN2014/094065 dated Mar. 17, 2015, 10 pages.
First Office Action in Chinese Application No. 201410005804.0 dated Dec. 17, 2015, 10 pages.
First Examination Report in Indian Application No. 201617026062 dated Nov. 13, 2020, 6 pages.
First Examination Report in Indian Application No. 202017046619 dated Jun. 23, 2021, 5 pages.
Notice of Reasons for Rejection in Japanese Application No. 2016545828 dated Jun. 20, 2017, 9 pages.
International Search Report in PCT/CN2018/084588 dated Oct. 12, 2018, 6 pages.
Written Opinion in PCT/CN2018/084588 dated Oct. 12, 2018, 10 pages.
The Extended European Search Report in European Application No. 14877111.6 dated Mar. 17, 2017, 6 pages.
The Extended European Search Report in European Application No. 18916724.0 dated Feb. 23, 2021, 13 pages.

* cited by examiner

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 17/074,762 filed on Oct. 20, 2020, which is a continuation-in-part of U.S. patent application Ser. No. 16/813,915 (now U.S. Pat. No. 10,848,878) filed on Mar. 10, 2020, which is a continuation of U.S. patent application Ser. No. 16/419,049 (now U.S. Pat. No. 10,616,696) filed on May 22, 2019, which is a continuation of U.S. patent application Ser. No. 16/180,020 (now U.S. Pat. No. 10,334,372) filed on Nov. 5, 2018, which is a continuation of U.S. patent application Ser. No. 15/650,909 (now U.S. Pat. No. 10,149,071) filed on Jul. 16, 2017, which is a continuation of U.S. patent application Ser. No. 15/109,831 (now U.S. Pat. No. 9,729,978) filed on Jul. 6, 2016, which is a U.S. National Stage entry under 35 U.S.C. § 371 of International Application No. PCT/CN2014/094065 filed on Dec. 17, 2014, designating the United States of America, which claims priority to Chinese Patent Application No. 201410005804.0, filed on Jan. 6, 2014; the present application is also a continuation-in-part of U.S. patent application Ser. No. 17/169,816 filed on Feb. 8, 2021, which is a continuation of U.S. patent application Ser. No. 17/079,438, filed on Oct. 24, 2020, which is a continuation of International Application No. PCT/CN2018/084588, filed on Apr. 26, 2018. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including: providing a bone conduction speaker including a vibration board fitting human skin and passing vibrations, a transducer, and a housing, wherein at least one sound guiding hole is located in at least one portion of the housing; the transducer drives the vibration board to vibrate; the housing vibrates, along with the vibrations of the transducer, and pushes air, forming a leaked sound wave transmitted in the air; the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein: the transducer is configured to generate vibrations and is located inside the housing; the vibration board is configured to be in contact with skin and pass vibrations; at least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
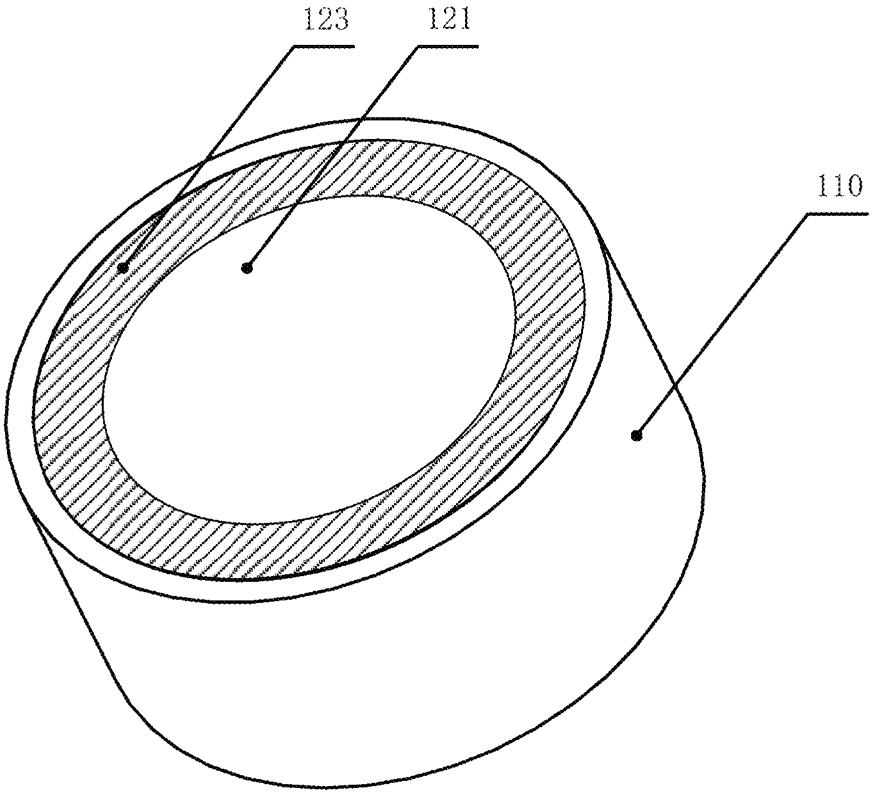
FIGS. 1A and 1B are schematic structures illustrating a bone conduction speaker of prior art.
Figure 1B:
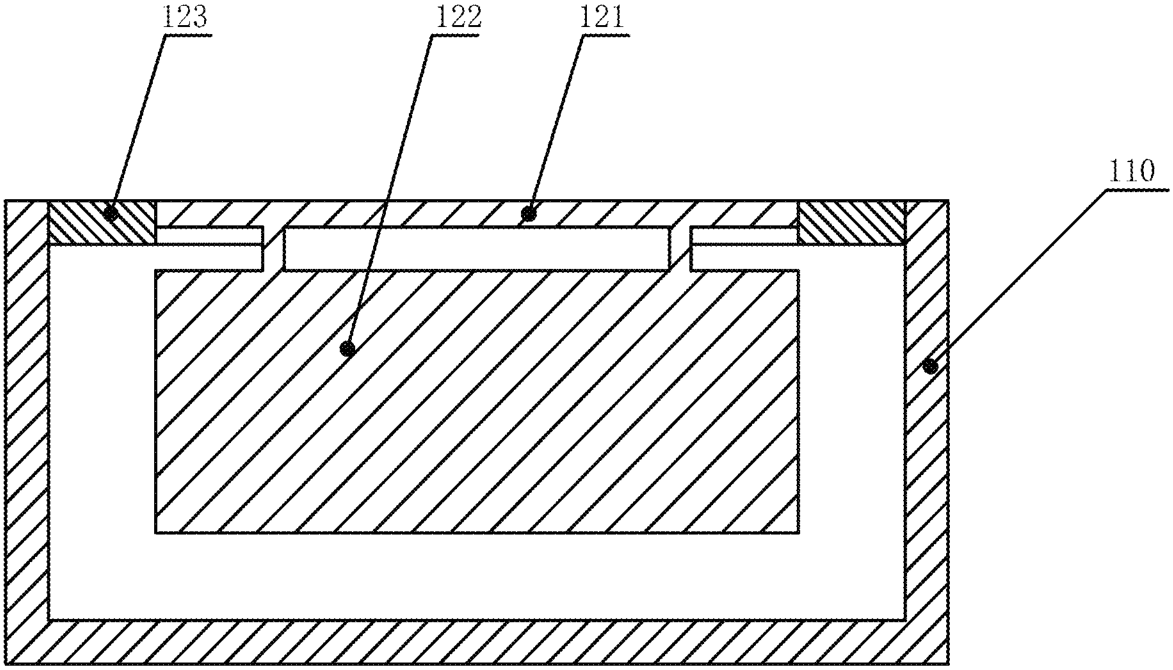
Figure 2:
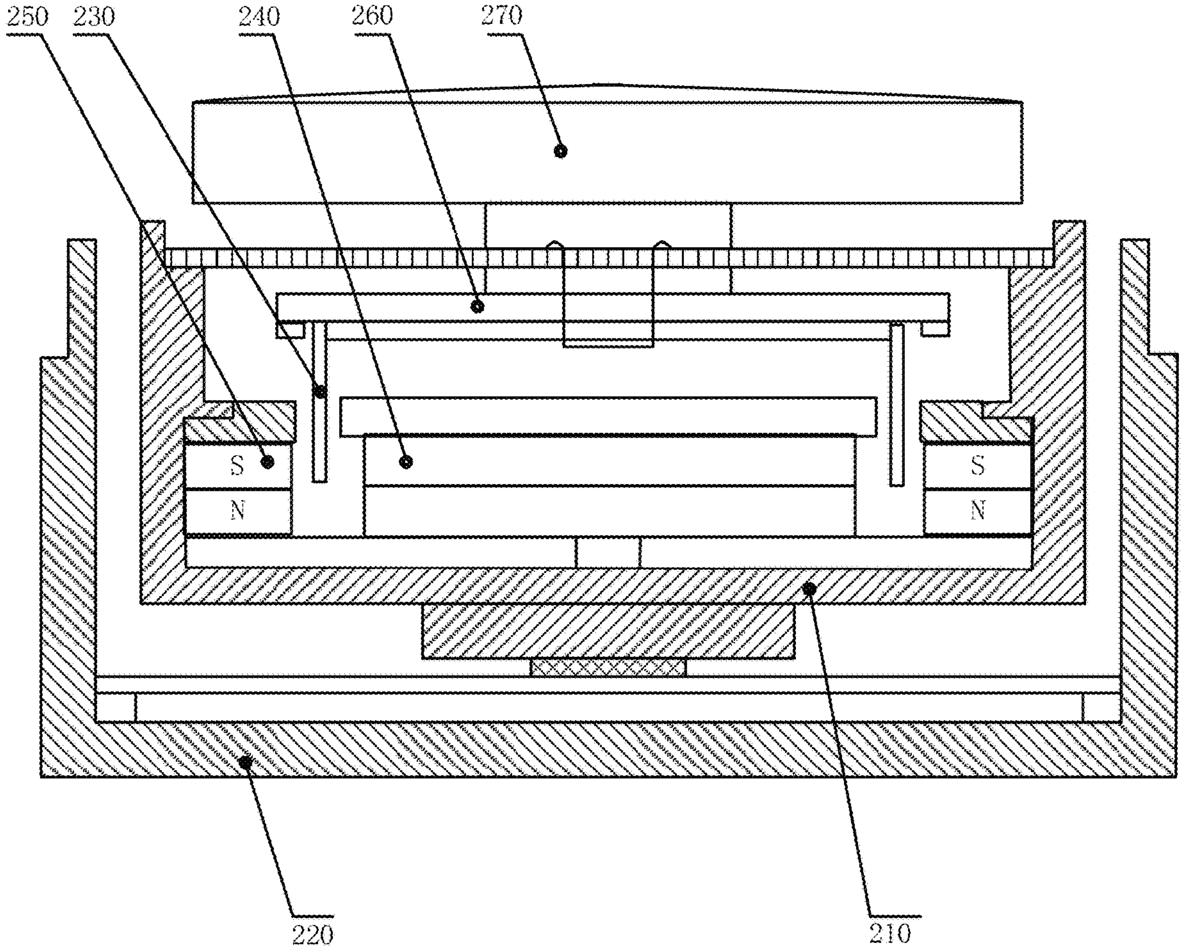
FIG. 2 is a schematic structure illustrating another bone conduction speaker of prior art.
Figure 3:
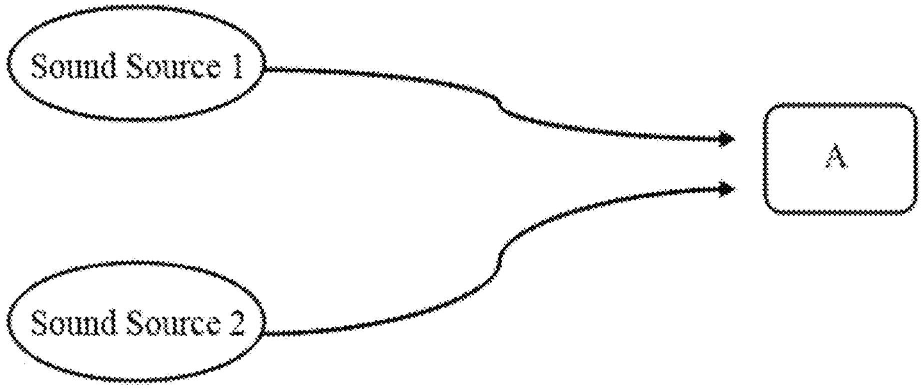
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
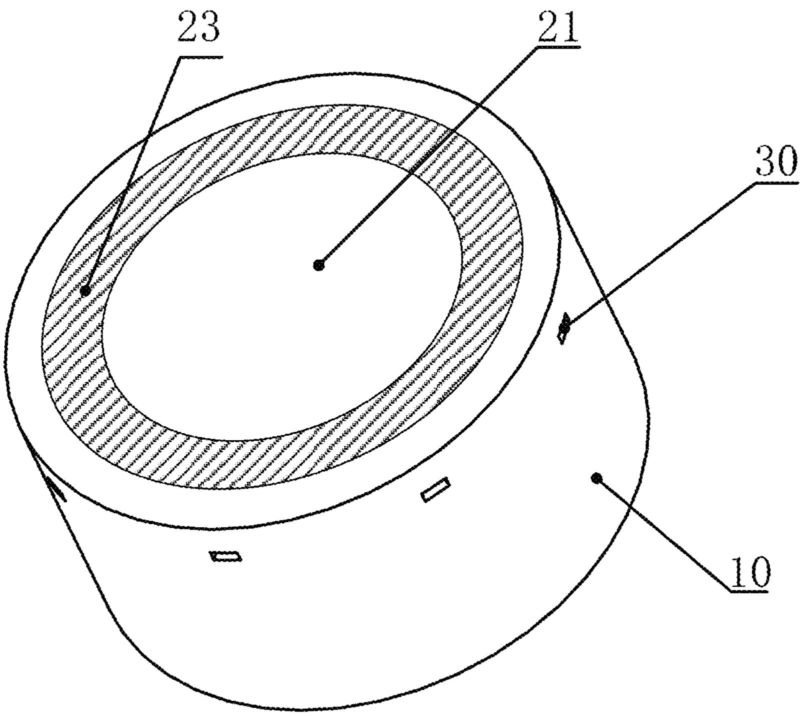
FIGS. 4A and 4B are schematic structures of an exemplary bone conduction speaker according to some embodiments of the present disclosure.
Figure 4B:
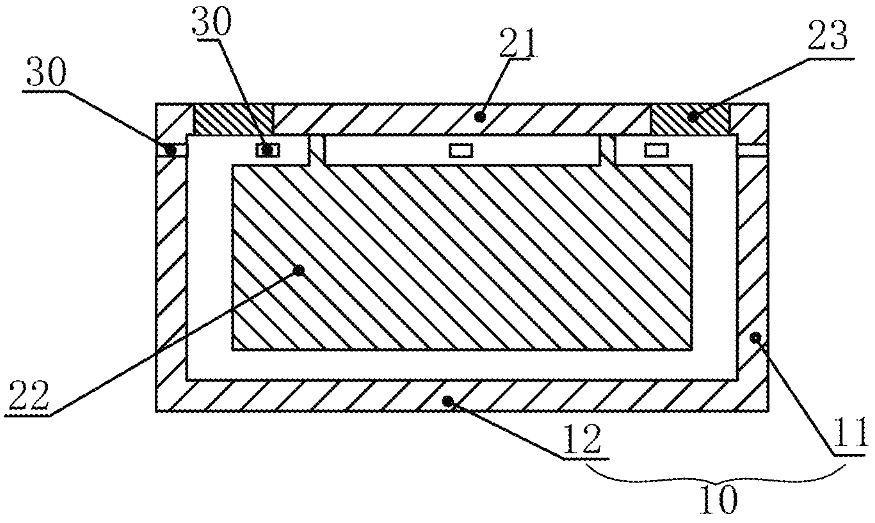

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
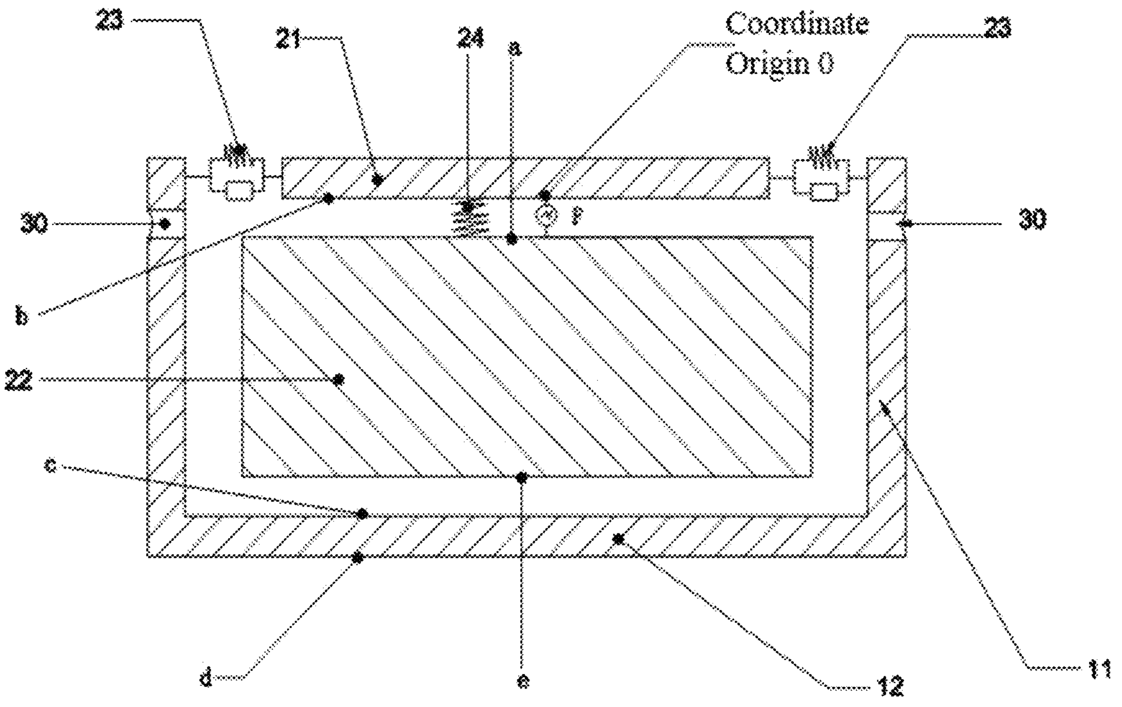
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$(\iint_{S_{hole}} P ds - \iint_{S_{housing}} P_d ds), \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $P=P_a+P_b+P_c+P_e$ (2) wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x'_a, y'_a) \cdot \frac{e^{jkR(x'_a, y'_a)}}{4\pi R(x'_a, y'_a)} dx'_a dy'_a - P_{aR}, \tag{3}$$

-continued $$P_b(x,y,z)=-j\omega\rho_0\int\int_{S_b}W_b(x',y')\cdot\frac{e^{jkR(x',y')}}{4\pi R(x',y')}dx'dy'-P_{bR}, \quad (4)$$

$$P_c(x,y,z)=-j\omega\rho_0\int\int_{S_c}W_c(x'_c,y'_c)\cdot\frac{e^{jkR(x'_c,y'_c)}}{4\pi R(x'_c,y'_c)}dx'_c dy'_c-P_{cR}, \quad (5)$$

$$P_e(x,y,z)=-j\omega\rho_0\int\int_{S_e}W_e(x'_e,y'_e)\cdot\frac{e^{jkR(x'_e,y'_e)}}{4\pi R(x'_e,y'_e)}dx'_e dy'_e-P_{eR}, \quad (6)$$

wherein $$R(x',y')=\sqrt{(x-x')^2+(y-y')^2+z^2}$$

is the distance between an observation point (x, y, z) and a point on side b (x', y', 0); $S_a$, $S_b$, $S_c$ and $S_e$ are the areas of side a, side b, side c and side e, respectively;

$$R(x'_a,y'_a)=\sqrt{(x-x'_a)^2+(y-y'_a)^2+(z-z_a)^2}$$

is the distance between the observation point (x, y, z) and a point on side a ($x_a'$, $y_a'$, $z_a$);

$$R(x'_c,y'_c)=\sqrt{(x-x'_c)^2+(y-y'_c)^2+(z-z_c)^2}$$

is the distance between the observation point (x, y, z) and a point on side c ($x_c'$, $y_c'$, $z_c$);

$$R(x'_e,y'_e)=\sqrt{(x-x'_e)^2+(y-y'_e)^2+(z-z_e)^2}$$

is the distance between the observation point (x, y, z) and a point on side e ($x_e'$, $y_e'$, $z_e$);

k=ω/u (u is the velocity of sound) is wave number, $\rho_0$ is an air density, ω is an angular frequency of vibration.

$P_{aR}$, $P_{bR}$, $P_{cR}$ and $P_{eR}$ are acoustic resistances of air, which respectively are:

$$P_{aR}=A\cdot\frac{z_a\cdot r+j\omega\cdot z_a\cdot r'}{\varphi}+\delta, \quad (7)$$

$$P_{bR}=A\cdot\frac{z_b\cdot r+j\omega\cdot z_b\cdot r'}{\varphi}+\delta, \quad (8)$$

$$P_{cR}=A\cdot\frac{z_c\cdot r+j\omega\cdot z_c\cdot r'}{\varphi}+\delta, \quad (9)$$

$$P_{eR}=A\cdot\frac{z_e\cdot r+j\omega\cdot z_e\cdot r'}{\varphi}+\delta, \quad (10)$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x,y)$, $W_b(x,y)$, $W_c(x,y)$, $W_e(x,y)$ and $W_d(x,y)$ are the sound source power per unit area of side a, side b, side c, side e and side d, respectively, which can be derived from following formulas (11):

$$F_e=F_a=F-k_1\cos\omega t-\iint_{S_a}W_a(x,y)dxdy-\iint_{S_e}W_e(x,y)dxdy-f,$$

$$F_b=-F+k_1\cos\omega t+\iint_{S_b}W_b(x,y)dxdy-\iint_{S_e}W_e(x,y)dxdy-L,$$

$$F_c=F_d=F_b-k_2\cos\omega t-\iint_{S_c}W_c(x,y)dxdy-f-\gamma,$$

$$F_d=F_b-k_2\cos\omega t-\iint_{S_d}W_d(x,y)dxdy, \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and f=ηΔs(dv/dy).

L is the equivalent load on human face when the vibration board acts on the human face, γ is the energy dissipated on elastic element 24, $k_1$ and $k_2$ are the elastic coefficients of elastic element 23 and elastic element 24 respectively, η is the fluid viscosity coefficient, dv/dy is the velocity gradient of fluid, Δs is the cross-section area of a subject (board), A is the amplitude, φ is the region of the sound field, and δ is a high order minimum (which is generated by the incompletely symmetrical shape of the housing).

The sound pressure of an arbitrary point outside the housing, generated by the vibration of the housing 10 is expressed as:

$$P_d=-j\omega\rho_0\int\int W_d(x'_d,y'_d)\cdot\frac{e^{jkR(x'_d,y'_d)}}{4\pi R(x'_d,y'_d)}dx'_d dy'_d, \quad (12)$$

wherein $$R(x'_d,y'_d)=\sqrt{(x-x'_d)^2+(y-y'_d)^2+(z-z_d)^2}$$

is the distance between the observation point (x, y, z) and a point on side d ($x_d'$, $y_d'$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}}$ Pds.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d ds$.

The leaked sound wave and the guided sound wave interference may result in a weakened sound wave, i.e., to make $\iint_{S_{hole}}$ Pds and $\iint_{S_{housing}} P_d ds$ have the same value but opposite directions, and the sound leakage may be reduced. In some embodiments, $\iint_{S_{hole}}$ Pds may be adjusted to reduce the sound leakage. Since $\iint_{S_{hole}}$ Pds corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
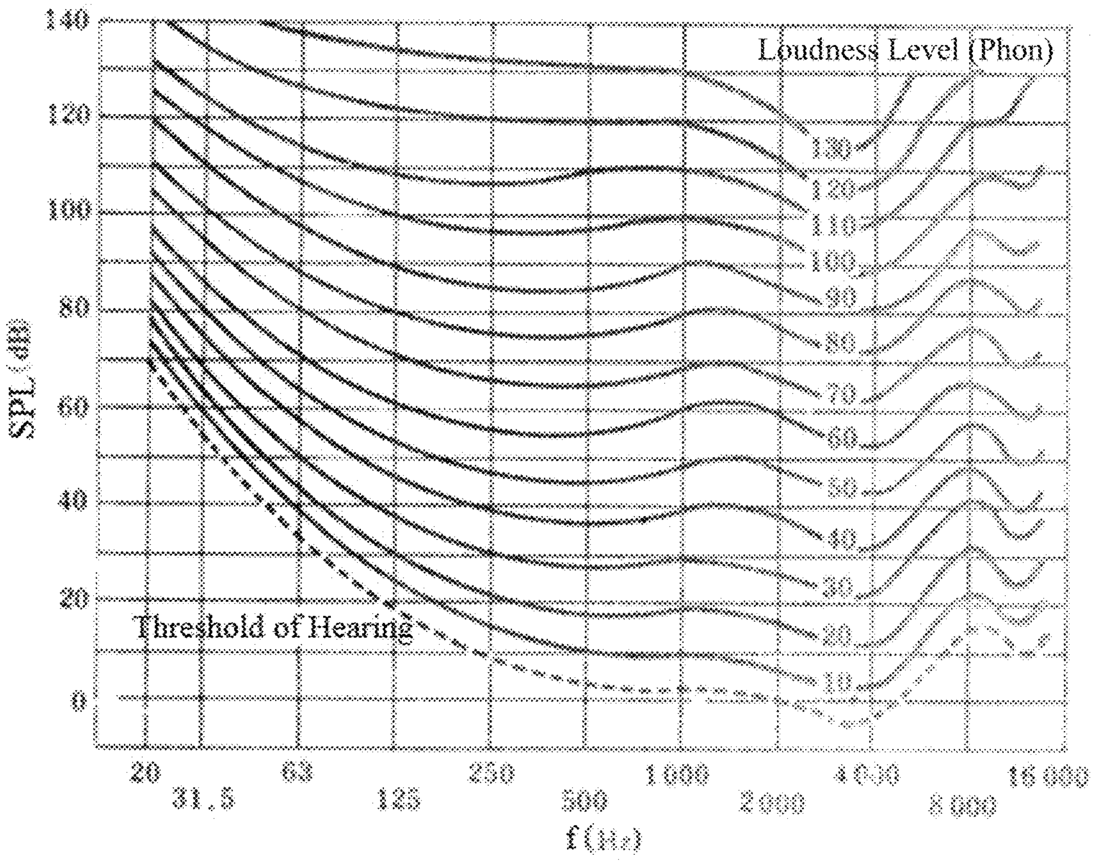
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
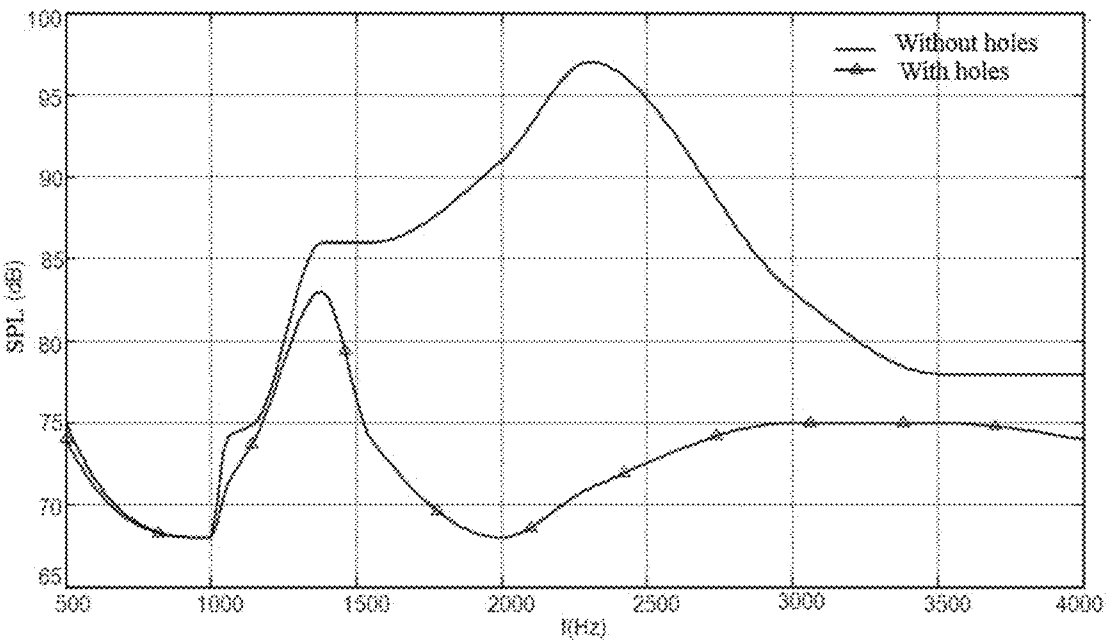
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
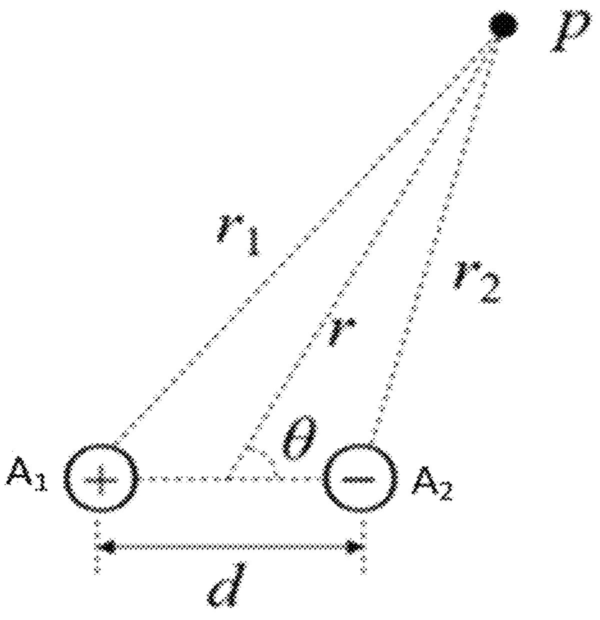
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \exp j(\omega t - kr), \quad (13)$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
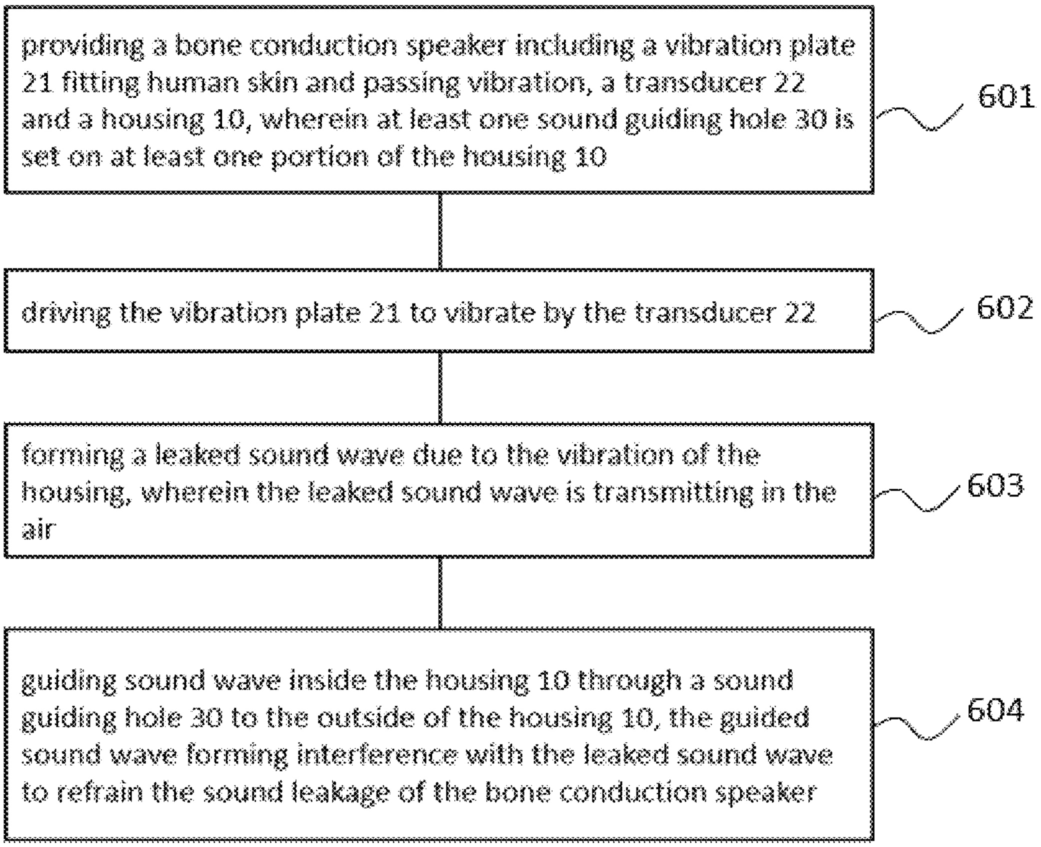
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration board 21 touching human skin and passing vibrations, a transducer 22, and a housing 10 is provided. At least one sound guiding hole 30 is arranged on the housing 10. At 602, the vibration board 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
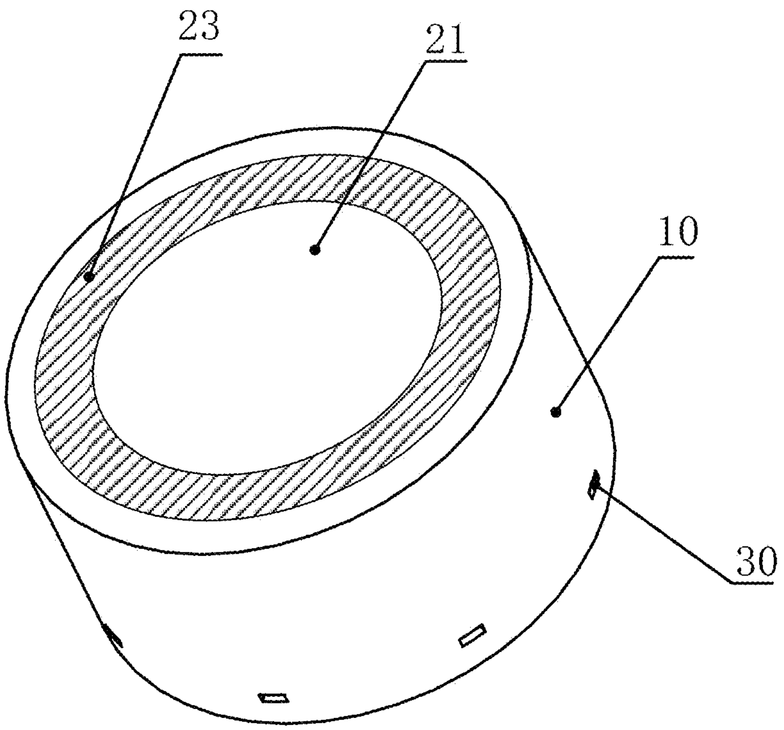
FIGS. 7A and 7B are schematic structures of an exemplary bone conduction speaker according to some embodiments of the present disclosure.
Figure 7B:
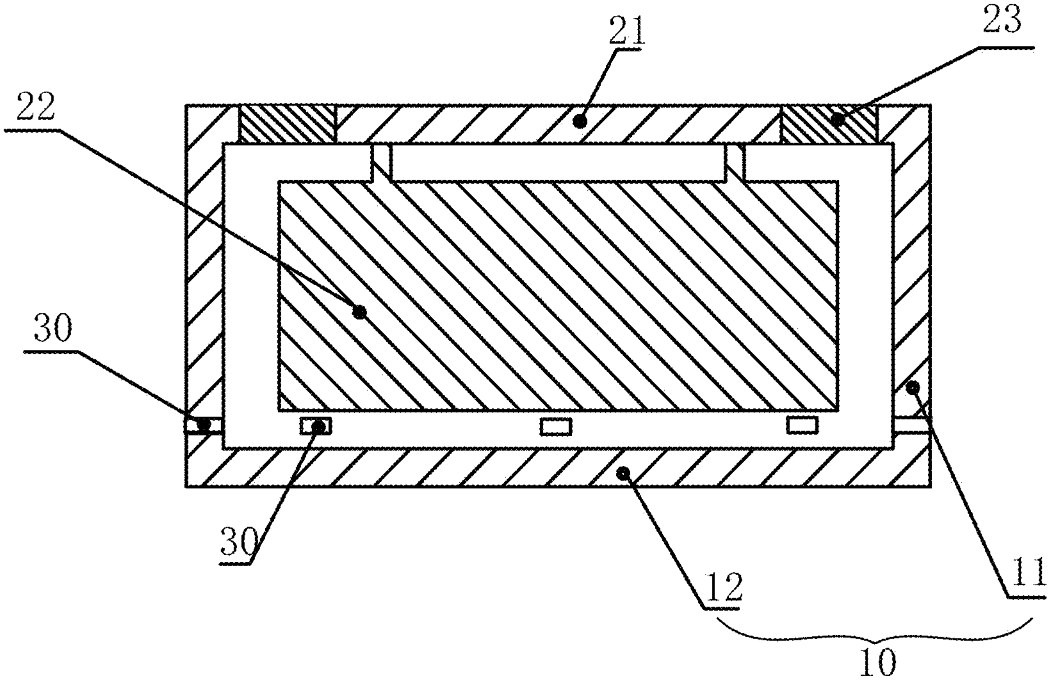

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may locate inside the housing and may generate synchronous vibrations with a same frequency.

Figure 7C:
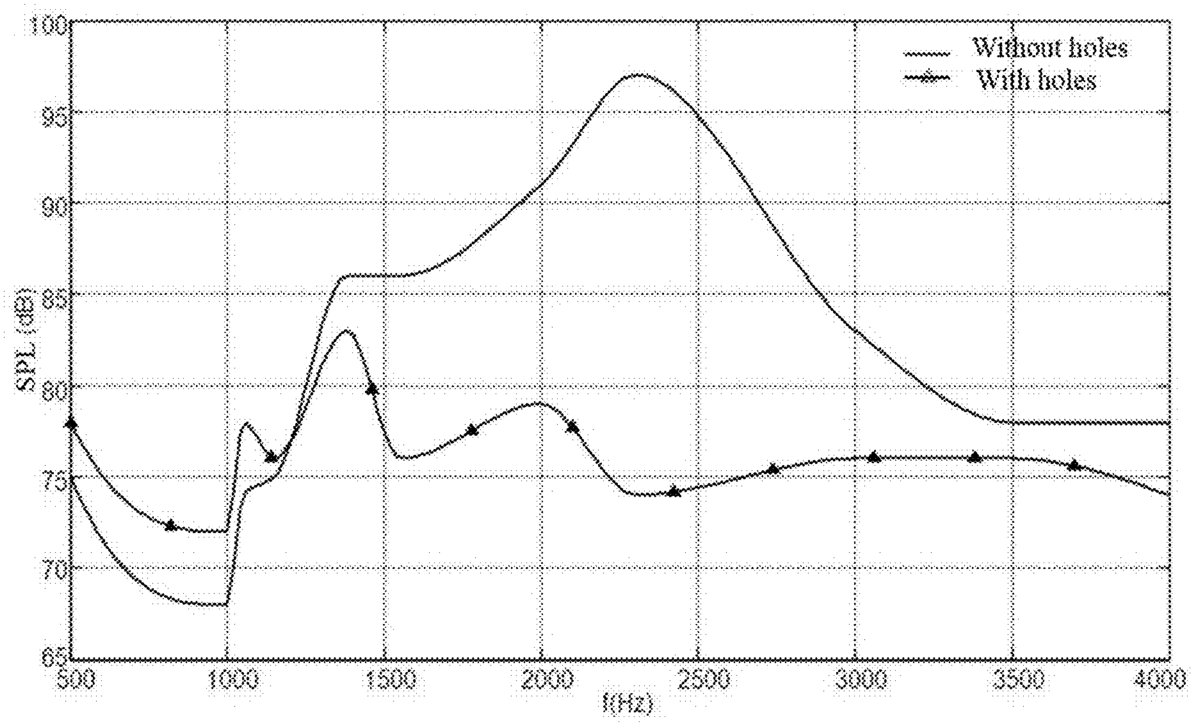
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
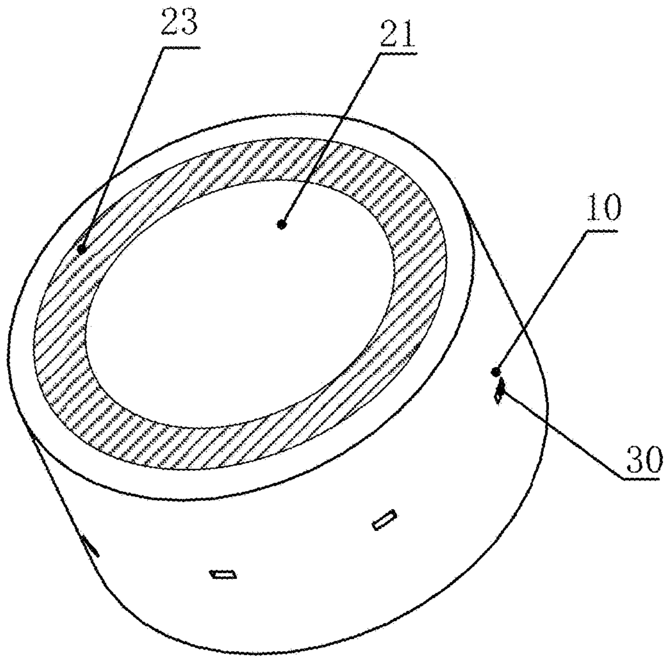
FIGS. 8A and 8B are schematic structure of an exemplary bone conduction speaker according to some embodiments of the present disclosure.
Figure 8B:
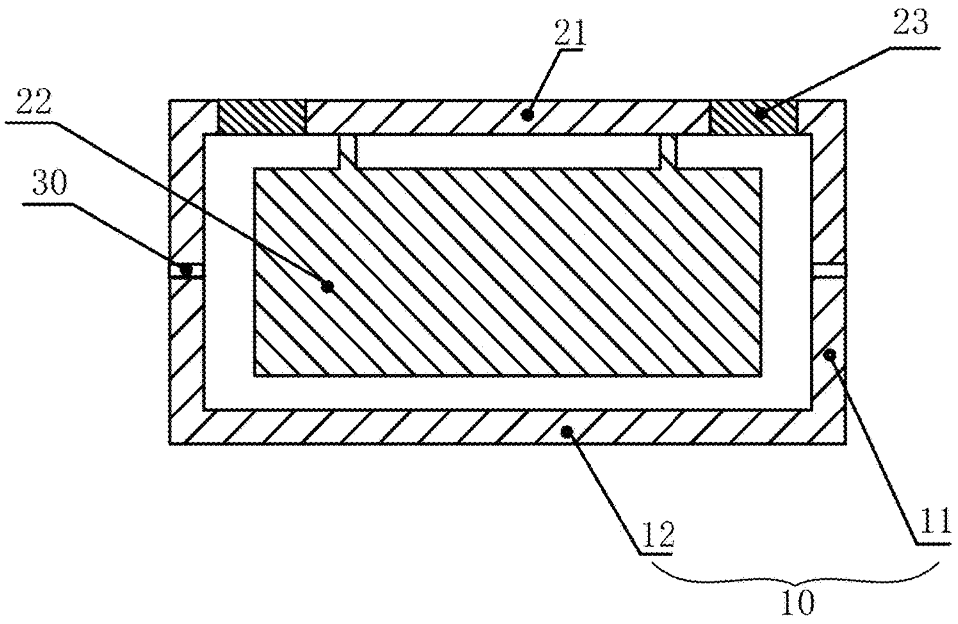

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
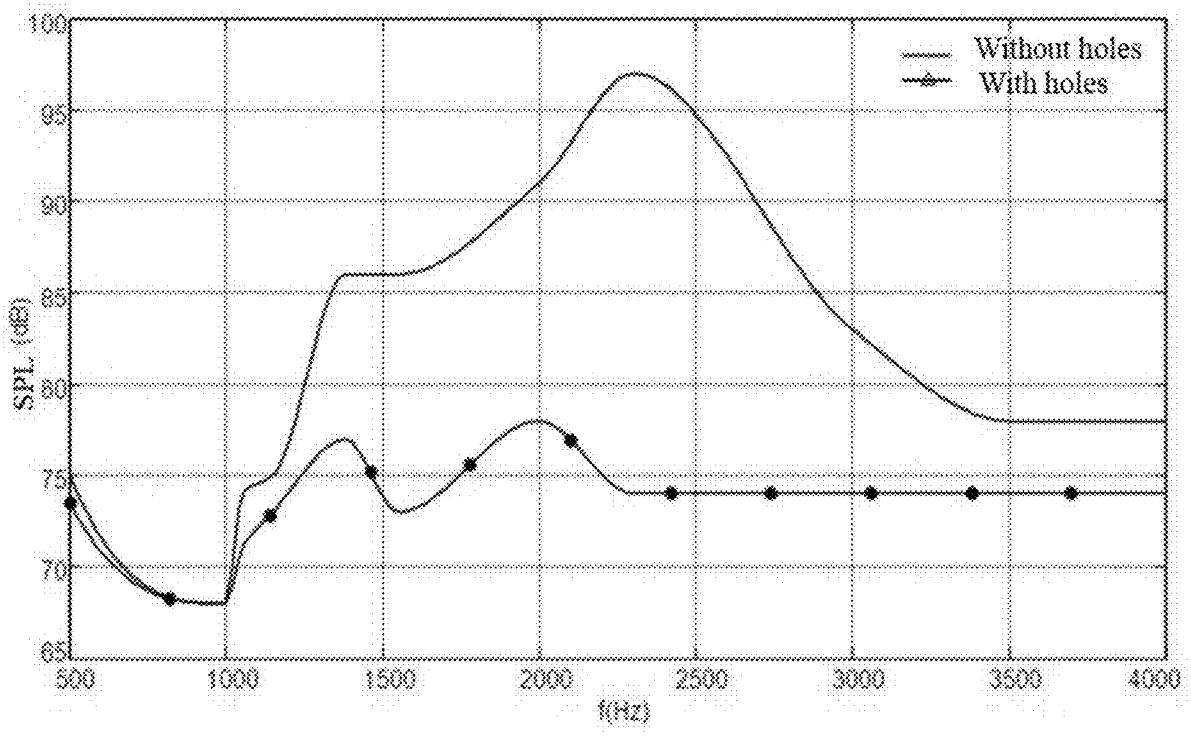
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
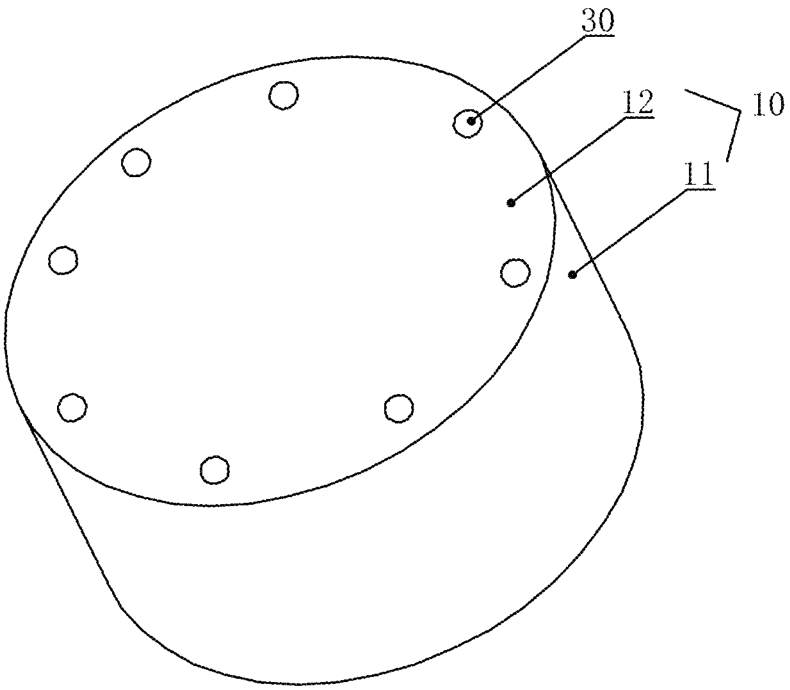
FIGS. 9A and 9B are schematic structures of an exemplary bone conduction speaker according to some embodiments of the present disclosure.
Figure 9B:
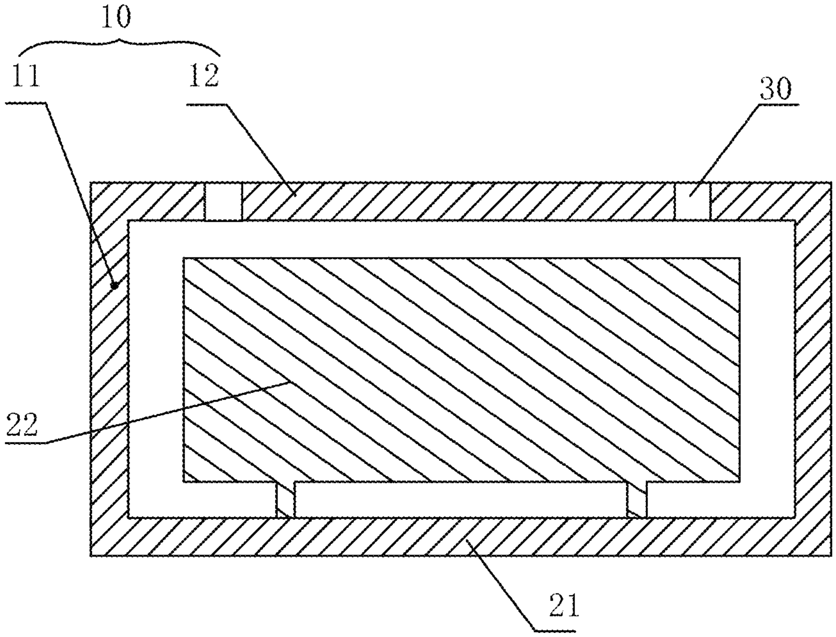

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
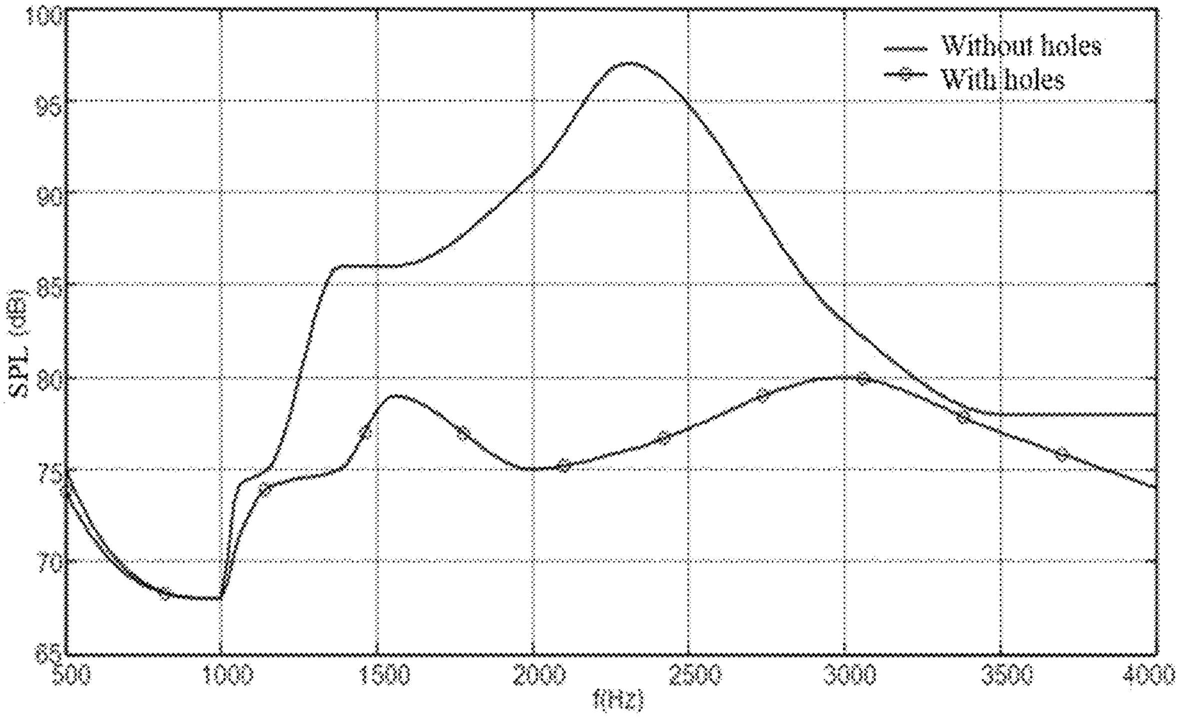
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1400 Hz~2700 Hz, the sound leakage is reduced by more than 10 dB; in the frequency range of 2200 Hz~2400 Hz, the sound leakage is reduced by more than 20 dB.

Embodiment Six

Figure 10A:
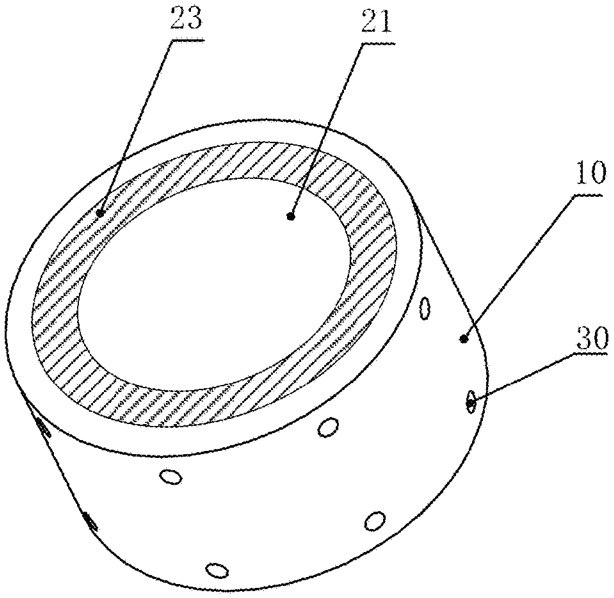
FIGS. 10A and 10B are schematic structures of an exemplary bone conduction speaker according to some embodiments of the present disclosure.
Figure 10B:
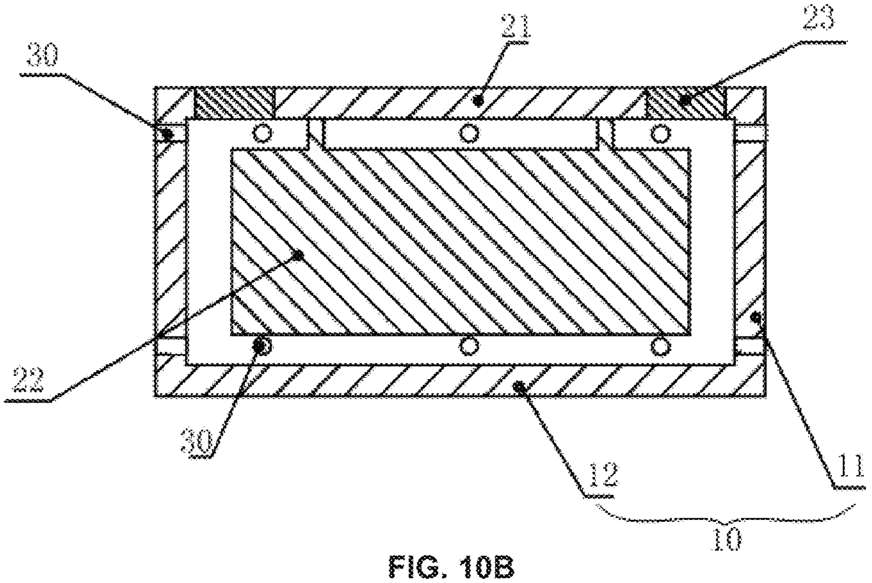

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
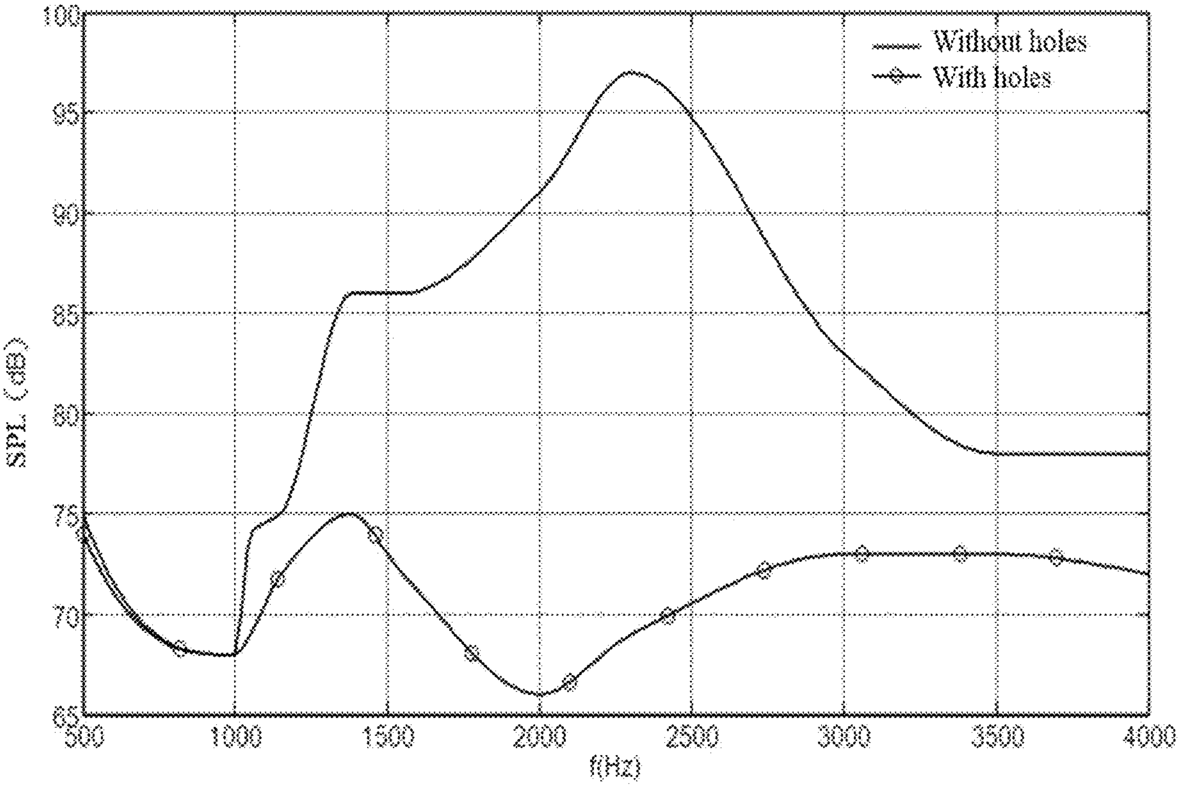
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
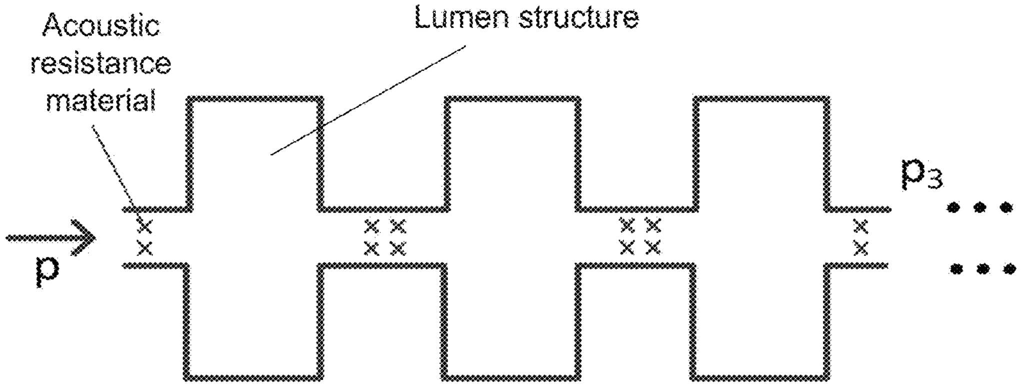
FIG. 10D is a schematic diagram illustrating an acoustic route according to some embodiments of the present disclosure.
Figure 10E:
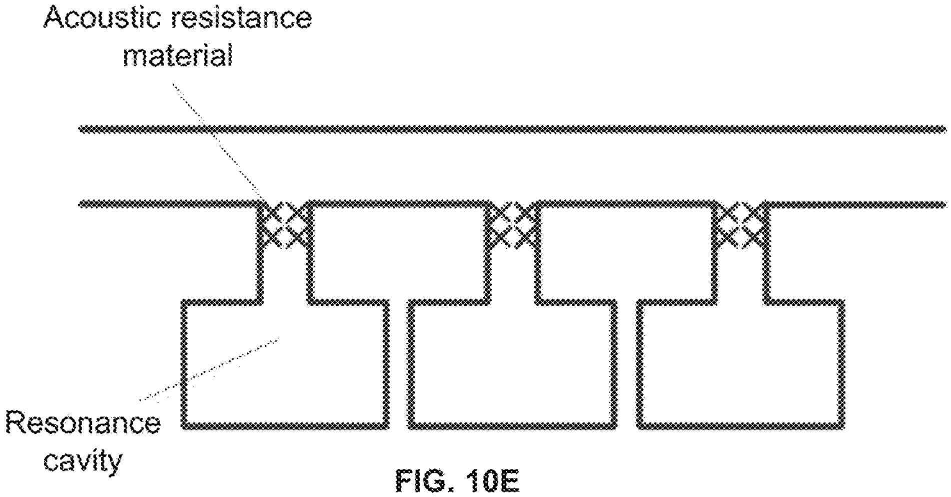
FIG. 10E is a schematic diagram illustrating another acoustic route according to some embodiments of the present disclosure.
Figure 10F:
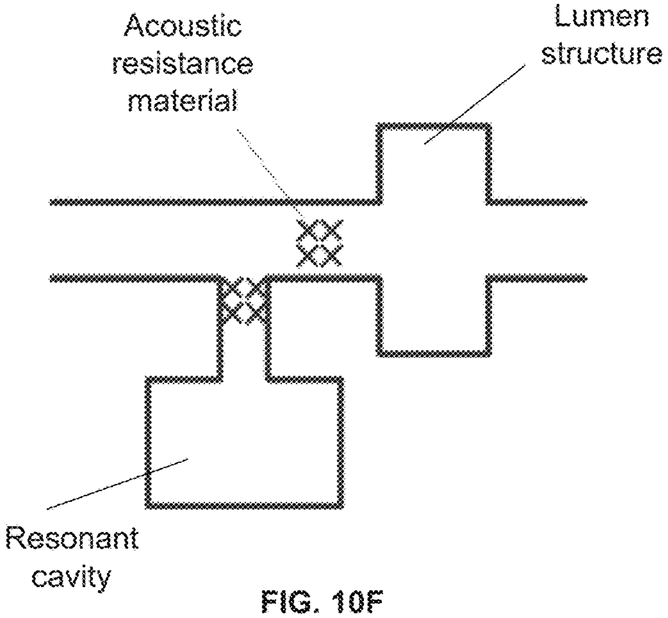
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5 MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s)

(e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
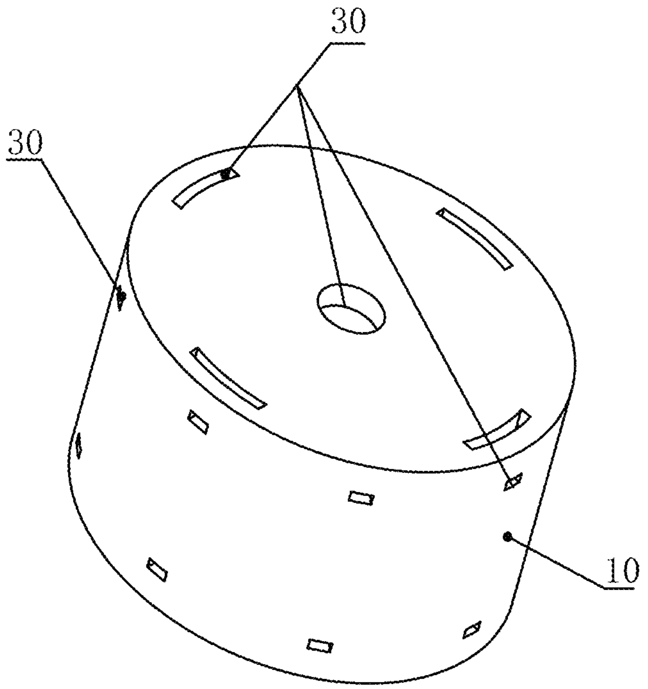
FIGS. 11A and 11B are schematic structures of an exemplary bone conduction speaker according to some embodiments of the present disclosure.
Figure 11B:
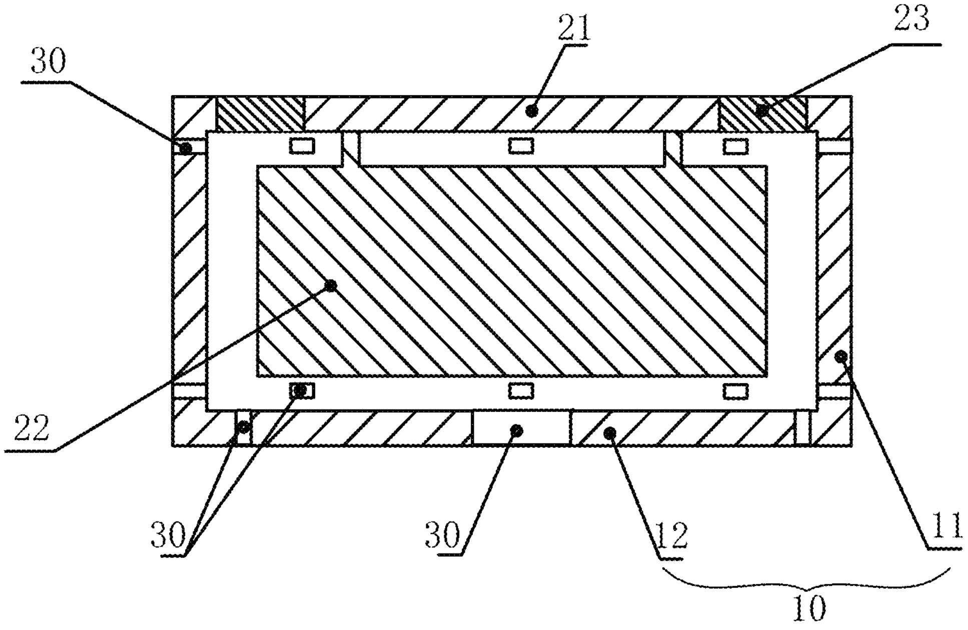

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
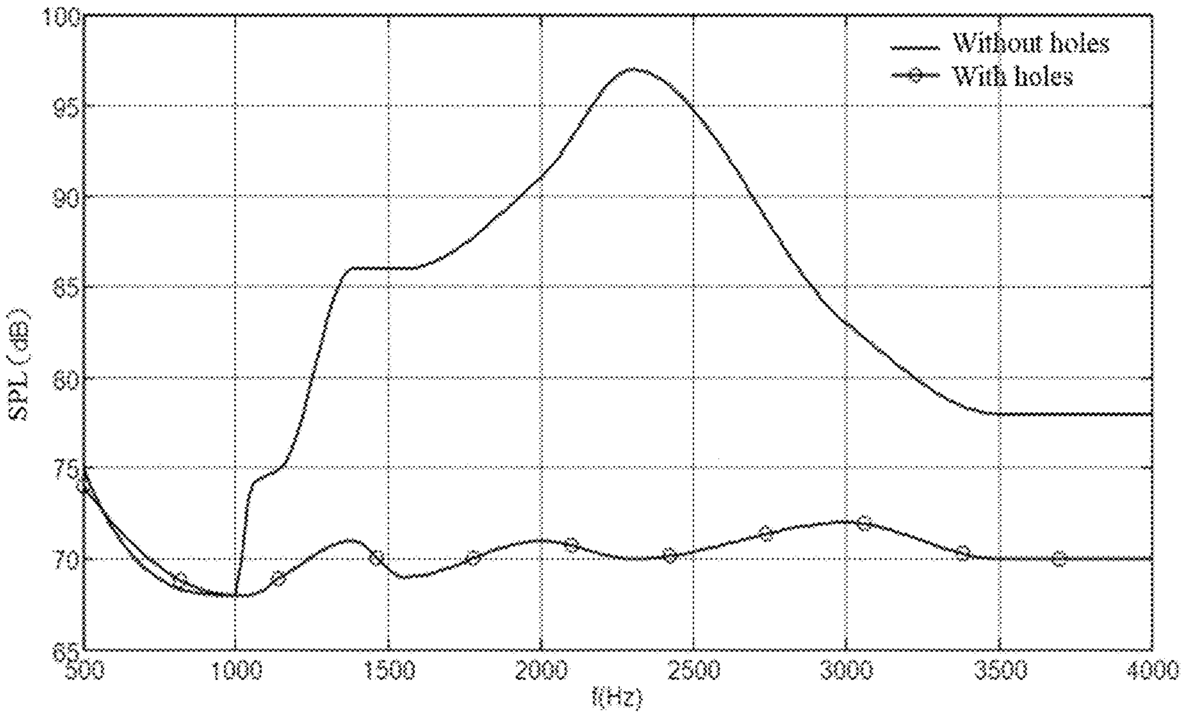
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1400 Hz and 2500 Hz~4000 Hz, this scheme has a better effect of reduced sound leakage than embodiment six.

Embodiment Eight

Figure 12A:
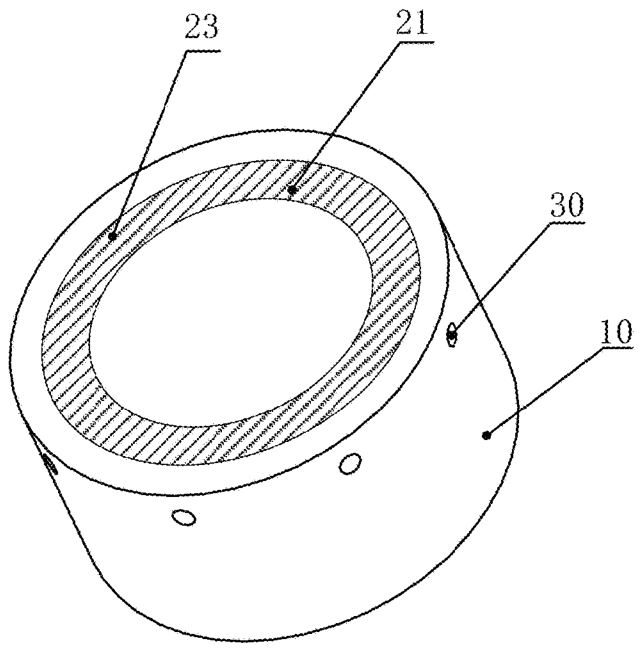
FIGS. 12A and 12B are schematic structures of an exemplary bone conduction speaker according to some embodiments of the present disclosure.
Figure 12B:
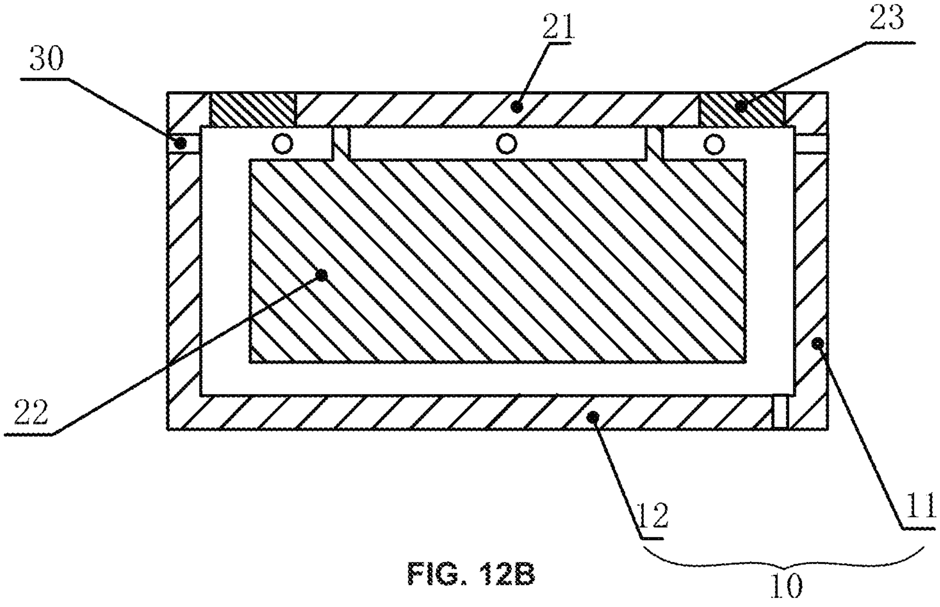

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
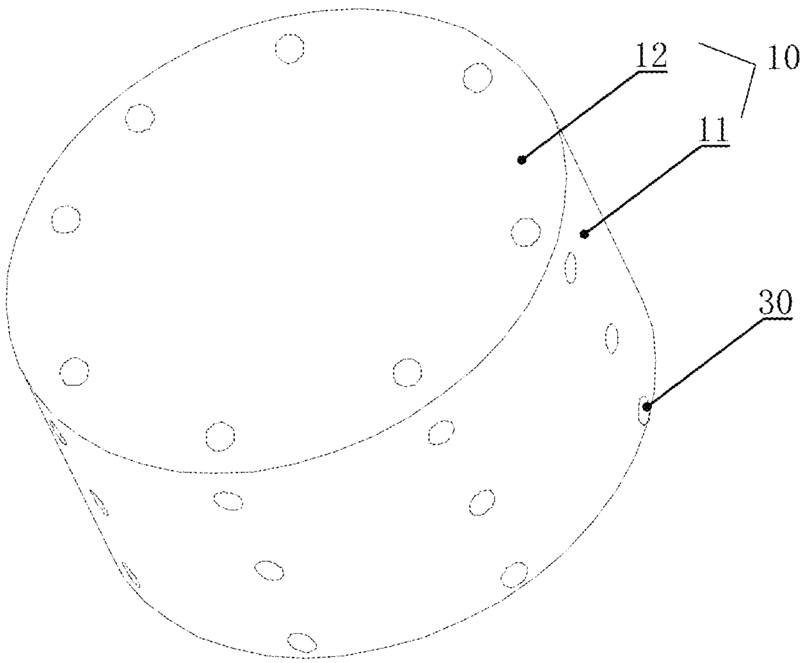
FIGS. 13A and 13B are schematic structures of an exemplary bone conduction speaker according to some embodiments of the present disclosure.
Figure 13B:
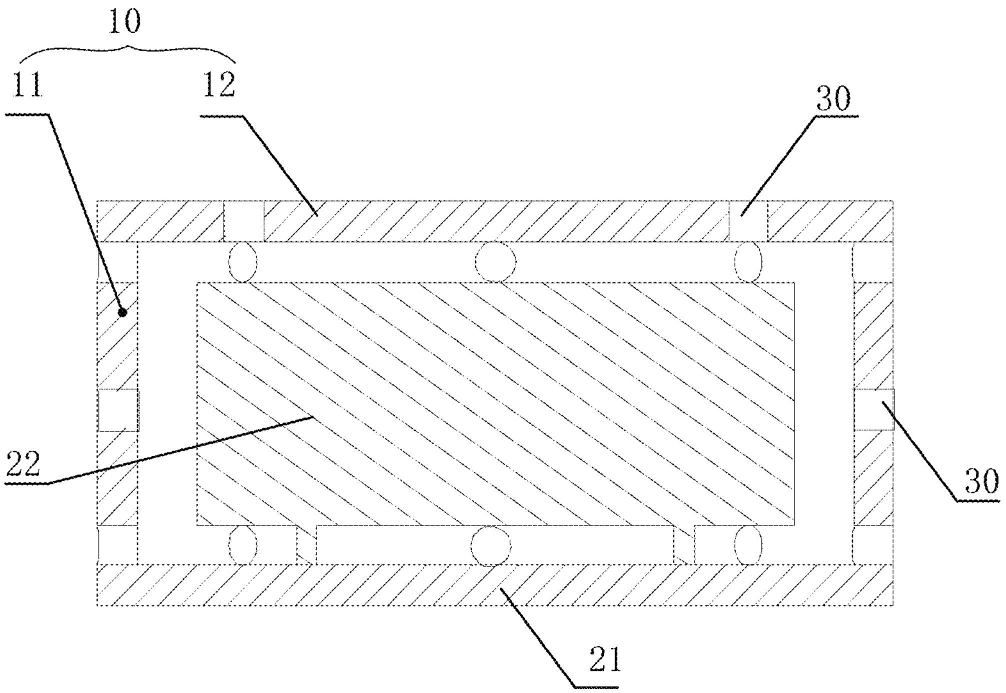

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

In some embodiments, a speaker as described elsewhere in the present disclosure (e.g., the speaker or the acoustic output device as shown in FIGS. 4A through 13B) may have a communication function through which the user may communicate with others. For example, the speaker may include a microphone configured to collect sound signals (e.g., the user's voice). The user may make a call using the speaker and communicate with others via the microphone. In some embodiments, noises (vibrations of a housing of the speaker, noises in the surrounding environment, etc.) may be collected by the microphones, which may cause echoes or other interferences during the communication. In some embodiments, the speaker may include a noise (or vibration) removal component (e.g., a dual-microphone component) configured to remove the noises, more descriptions of which may be found in the following descriptions.

Figure 14:
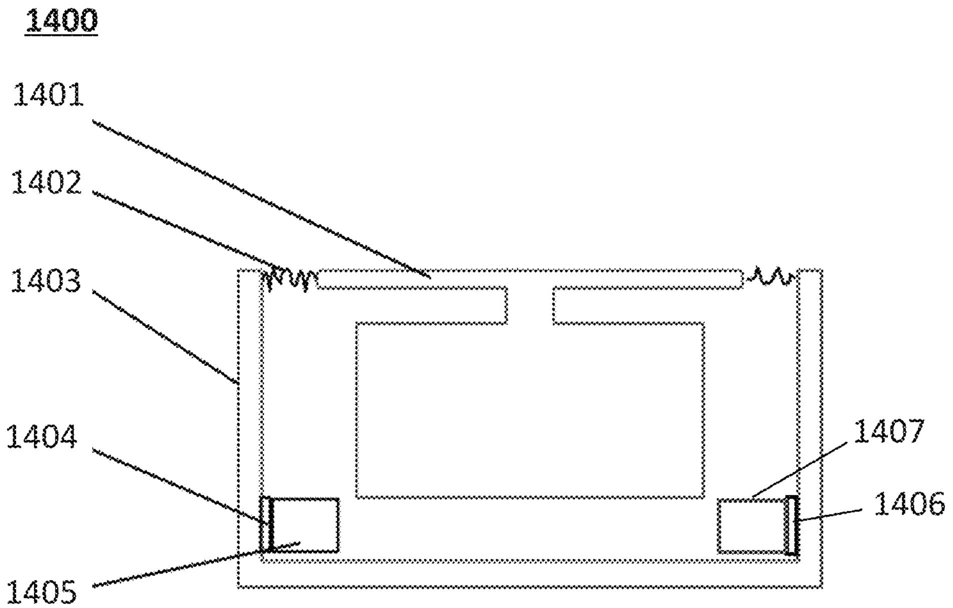
FIG. 14 is a schematic diagram illustrating a structure of a dual-microphone speaker according to some embodiments of the present disclosure.

FIG. 14 is a schematic diagram illustrating a structure of a speaker 1400 according to some embodiments of the present disclosure. The speaker 1400 may include a vibration component 1401 (e.g., the transducer 22), an elastic structure 1402 (e.g., the vibration board 21), a housing 1403 (e.g., the housing 10), a first connecting structure 1404, a microphone 1405, a second connecting structure 1406, and a vibration sensor 1407.

The vibration component 1401 may convert electrical signals into sound signals. The sound signals may be transmitted to a user through air conduction or bone conduction. For example, the speaker 1400 may contact the user's head directly or through a specific medium (e.g., one or more panels), and transmit the sound signal to the user's auditory nerve in the form of skull vibration. In some embodiments, the vibration component 1401 may reside inside the housing 1403 and configured to generate vibrations. The vibrations may produce a sound wave inside the housing 1403 and cause a leaked sound wave spreading outside the housing 1403 from a portion of the housing 1403. The sound wave inside the housing 1403 may be guided through at least one sound guiding hole to an outside of the housing 1403. The guided sound wave may have a phase different from a phase of the leaked sound wave. The guided sound wave may interfere with the leaked sound wave in a target region. More descriptions of which may be found elsewhere in the present disclosure (e.g., FIGS. 4A through 13B and relevant descriptions thereof).

The housing 1403 may be used to support and protect one or more components in the speaker 1400 (e.g., the vibration component 1401). The elastic structure 1402 may connect the vibration component 1401 and the housing 1403. In some embodiments, the elastic structure 1402 may fix the vibration component 1401 in the housing 1403 in a form of a metal sheet, and reduce vibration transmitted from the vibration component 1401 to the housing 1403 in a vibration damping manner.

The microphone 1405 may collect sound signals in the environment (e.g., the user's voice), and convert the sound signals into electrical signals. In some embodiments, the microphone 1405 may acquire sound transmitted through the air (also referred to as "air conduction microphone").

The vibration sensor 1407 may collect mechanical vibration signals (e.g., signals generated by vibration of the housing 1403), and convert the mechanical vibration signals into electrical signals. In some embodiments, the vibration sensor 1407 may be an apparatus that is sensitive to mechanical vibration and insensitive to air-conducted sound (that is, the responsiveness of the vibration sensor 1407 to mechanical vibration exceeds the responsiveness of the vibration sensor 1407 to air-conducted sound). The mechanical vibration signal used herein mainly refers to vibration propagated through solids. In some embodiments, the vibration sensor 1407 may be a bone conduction microphone. In some embodiments, the vibration sensor 1407 may be obtained by changing a configuration of the air conduction microphone. Details regarding changing the air conduction microphone to obtain the vibration sensor may be found in other parts, of the present disclosure, for example, FIGS. 22B and 22C, and the descriptions thereof.

The microphone 1405 may be connected to the housing 1403 through the first connection structure 1404. The vibration sensor 1407 may be connected to the housing 1403 through the second connection structure 1406. The first connection structure 1404 and/or the second connection structure 1406 may connect the microphone 1405 and the vibration sensor 1407 to the inner side of the housing 1403 in the same or different manner. Details regarding the first connection structure 1404 and/or the second connection structure 1406 may be found in other parts of the present disclosure, for example, FIG. 18 and/or FIG. 20, and the descriptions thereof.

Due to the influence of other components in the speaker 1400, the microphone 1405 may generate noises during operation. For illustration purposes only, a noise generation process of the microphone 1405 may be described as follows. The vibration component 1401 may vibrate when an electric signal is applied. The vibration component 1401 may transmit the vibration to the housing 1403 through the elastic structure 1402. Since the housing 1403 and the microphone 1405 are directly connected through the first connection structure 1404, the vibration of the housing 1403 may cause the vibration of a diaphragm in the microphone 1405. In such cases, noises (also referred to as "vibration noise" or "mechanical vibration noise") may be generated.

The vibration signal obtained by the vibration sensor 1407 may be used to eliminate the vibration noise generated in the microphone 1405. In some embodiments, a type of the microphone 1405 and/or the vibration sensor 1407, a position where the microphone 1405 and/or the vibration sensor 1407 is connected to the inner side of the housing 1403, a connection manner between the microphone 1405 and/or the vibration sensor 1407 and the housing 1403 may be selected such that an amplitude-frequency response and/or a phase-frequency response of the microphone 1405 to vibration may be consistent with that of the vibration sensor 1407, thereby eliminating the vibration noise generated in the microphone 1405 using the vibration signal collected by the vibration sensor 1407.

The above description of the structure of the speaker 1400 is only a specific example and should not be regarded as the only feasible implementation. Obviously, for those skilled in the art, after understanding the basic principles of speakers, it may be possible to make various modifications and changes in the form and details of the specific methods of implementing speakers without departing from the principles. However, these modifications and changes are still within the scope described above. For example, the speaker 1400 may include more microphones or vibration sensors to eliminate vibration noises generated by the microphone 1405.

Figure 15A:
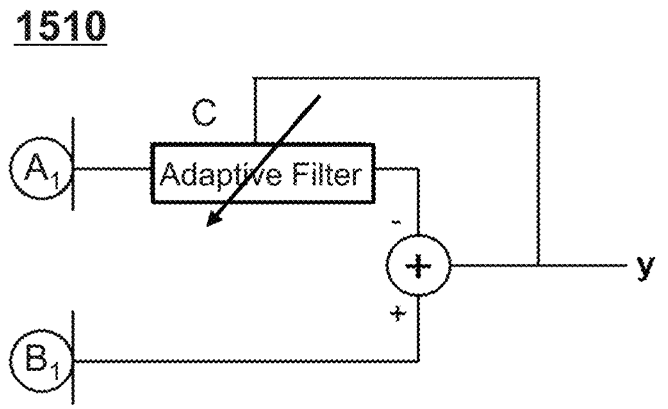
FIGS. 15A to 15C are schematic diagrams illustrating signal processing methods for removing vibration noises according to some embodiments of the present disclosure.

FIG. 15A is a schematic diagram illustrating a signal processing method for removing vibration noises according to some embodiments of the present disclosure. In some embodiments, the signal processing method may include causing the vibration noise signal received by the microphone to be offset with the vibration signal received by the vibration sensor using a digital signal processing method. In some embodiments, the signal processing method may include directly causing the vibration noise signal received by the microphone and the vibration signal received by the vibration sensor to offset each other using an analog signal generated by an analog circuit. In some embodiments, the signal processing method may be implemented by a signal processing unit in the speaker.

As shown in FIG. 15A, in the signal processing circuit 1510, $A_1$ is a vibration sensor (e.g., the vibration sensor 1407), $B_1$ is a microphone (e.g., the microphone 1405). The vibration sensor $A_1$ may receive a vibration signal, and the microphone $B_1$ may receive an air-conducted sound signal and a vibration noise signal. The vibration signal received by the vibration sensor $A_1$ and the vibration noise signal received by the microphone $B_1$ may originate from a same vibration source (e.g., the vibration component 1401). The vibration signal received by the vibration sensor $A_1$, after passing through an adaptive filter C, may be superimposed with the vibration noise signal received by the microphone $B_1$. The adaptive filter C may adjust the vibration signal received by the vibration sensor $A_1$ according to the superposition result (e.g., adjust amplitude and/or phase of the vibration signal) so as to cause the vibration signal received by the vibration sensor $A_1$ to offset the vibration noise signal received by the microphone $B_1$, thereby removing noises.

In some embodiments, parameters of the adaptive filter C may be fixed. For example, since a connection position and a connection manner between the vibration sensor A1 and the housing of the speaker, and between the microphone B1 and the housing of the speaker are fixed, an amplitude-frequency response and/or a phase-frequency response of the vibration sensor $A_1$ and the microphone $B_1$ to vibration may remain unchanged. Therefore, the parameters of the adaptive filter C may be stored in a signal processing chip after being determined, and may be directly used in the signal processing circuit 1510. In some embodiments, the parameters of the adaptive filter C may be variable. In a noise removal process, the parameters of the adaptive filter C may be adjusted according to the signals received by the vibration sensor $A_1$ and/or the microphone $B_1$ to remove noises.

Figure 15B:
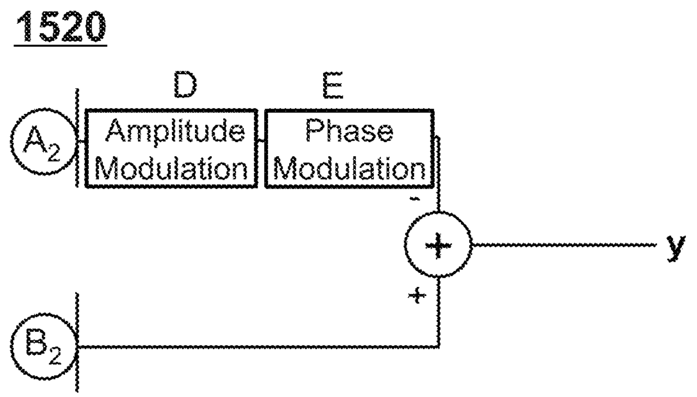

FIG. 15B is a schematic diagram illustrating a signal processing method for removing vibration noises according to some embodiments of the present disclosure. A difference between FIG. 15A and FIG. 5-B is that, instead of the adaptive filter C, a signal amplitude modulation component D and a signal phase modulation component E are used in the signal processing circuit 1520 of FIG. 15B. After amplitude and phase modulation, the vibration signal received by the vibration sensor $A_2$ may offset the vibration noise signal received by the microphone $B_2$, thereby removing noises. In some embodiments, the signal processing method may be implemented by a signal processing unit in the speaker. In some embodiments, the signal amplitude modulation element D or the signal phase modulation element E may be unnecessary.

Figure 15C:
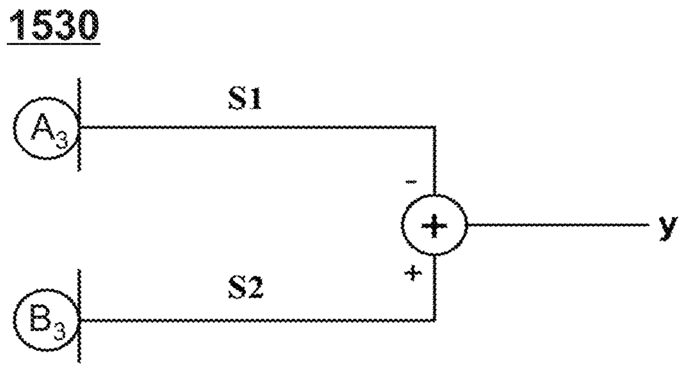

FIG. 15C is a schematic diagram illustrating a signal processing method for removing vibration noises according to some embodiments of the present disclosure. Different from the signal processing circuit in FIGS. 15A and 15B, in FIG. 15C, due to a reasonable structural design, the vibration noise signal S2 obtained by the microphone $B_3$ may be directly subtracted with the vibration signal S1 received by the vibration sensor $A_3$, thereby removing noises. In some embodiments, the signal processing method may be implemented by a signal processing unit in the speaker.

It should be noted that in the process of processing the two signals in FIG. 15A, 15B or 15C, a superposition process of the signal received by the vibration sensor and the signal received by the microphone may be understood as a process in which a part related to the vibration noise in the signal received by the microphone may be removed based on the signal received by the vibration sensor, thereby removing the vibration noise.

The above description of noise removal is only a specific example and should not be regarded as the only feasible implementation. Obviously, for those skilled in the art, after understanding the basic principles of speakers, it may be possible to make various modifications and changes in the form and details of the specific methods of implementing noise removal without departing from this principle. However, these modifications and changes are still within the scope described above. For example, for those skilled in the art, the adaptive filter C, the signal amplitude modulation component D, and the signal phase modulation component E may be replaced by other components or circuits that may be used for signal conditioning, as long as the replacement components or circuits can achieve the purpose of adjusting the vibration signal of the vibration sensor to remove the vibration noise signal in the microphone.

Figure 16:
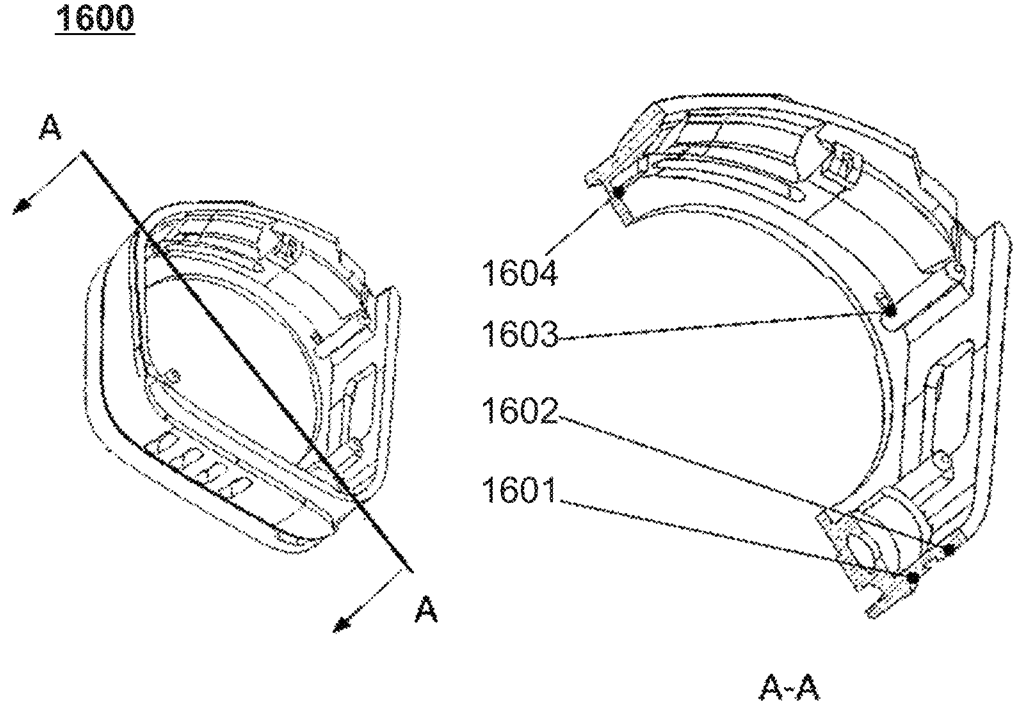
FIG. 16 is a schematic diagram illustrating a structure of a housing of a speaker according to some embodiments of the present disclosure.

As mentioned above, the amplitude-frequency response and/or phase-frequency response of the vibration sensor and/or the microphone to vibration may be related to a position on which it is located on the housing of the speaker. By adjusting the position of the vibration sensor and/or the microphone connected to the housing, the amplitude-frequency response and/or phase-frequency response of the microphone to vibration may be basically consistent with that of the vibration sensor, such that the vibration signal collected by the vibration sensor may be used to offset the vibration noise generated by the microphone. FIG. 16 is a schematic diagram illustrating a structure of a housing of a speaker according to some embodiments of the present disclosure. As shown in FIG. 16, the housing 1600 may be annular. The housing 1600 may support and protect the vibration component (e.g., the vibration component 1401) in the speaker. Position 1601, position 1602, position 1603, and position 1604 are four optional positions in the housing 1600 where a microphone or a vibration sensor may be placed. When the microphone and the vibration sensor are connected to different positions in the housing 1600, the amplitude-frequency response and/or phase-frequency response of the microphone and the vibration sensor to vibration may also be different. Among the positions, position 1601 and position 1602 are adjacent. Position 1603 and position 1601 are located at adjacent corners of the housing 1600. Position 1604 is the farthest from position 1601 and is located at a diagonal position of the housing 1600.

Figure 17A:
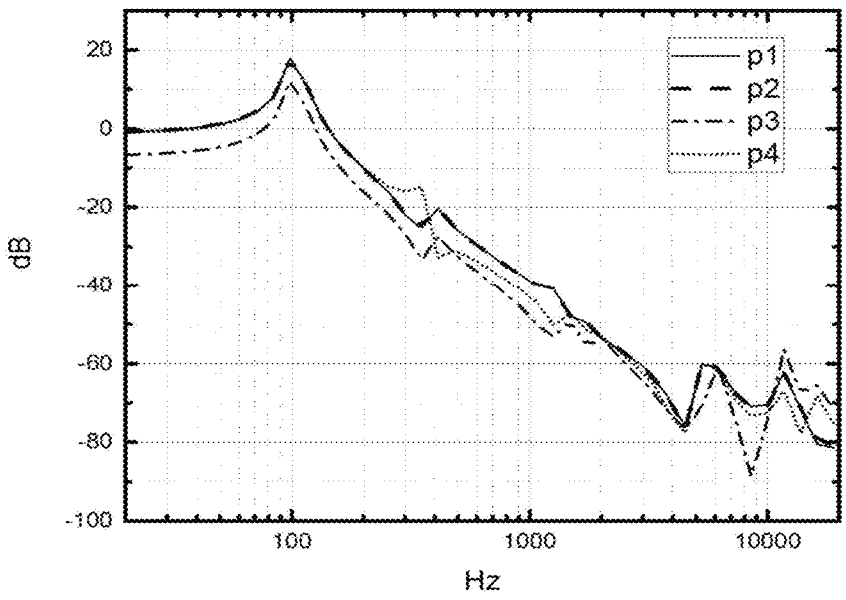
FIG. 17A is a schematic diagram illustrating amplitude-frequency response curves of a microphone disposed at different positions of a housing of a speaker according to some embodiments of the present disclosure.
Figure 17B:
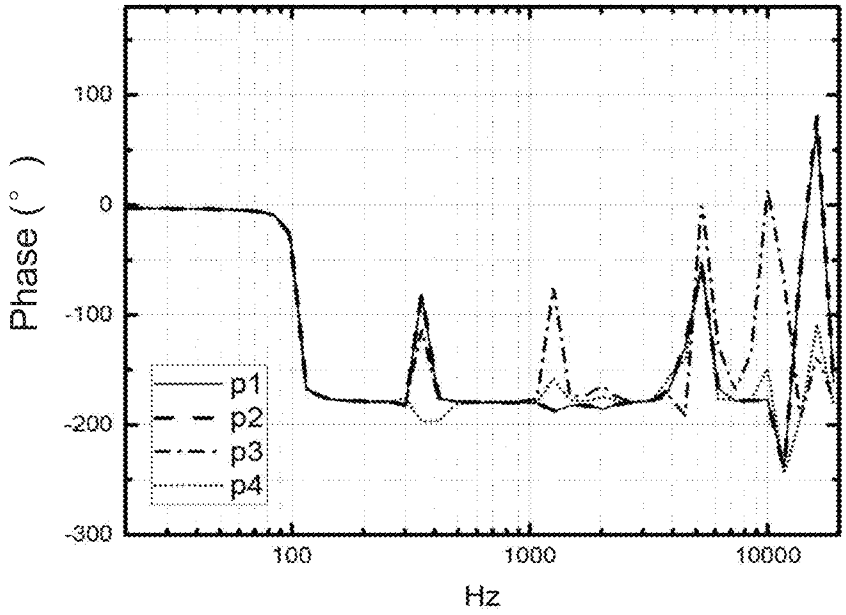
FIG. 17B is a schematic diagram illustrating phase-frequency response curves of a microphone disposed at different positions of a housing of a speaker according to some embodiments of the present disclosure.

FIG. 17A is a schematic diagram illustrating amplitude-frequency response curves of a microphone disposed at different positions of a housing of a speaker according to some embodiments of the present disclosure. FIG. 17B is a schematic diagram illustrating phase-frequency response curves of a microphone disposed at different positions of a housing of a speaker according to some embodiments of the present disclosure. As shown in FIG. 17A, the horizontal axis denotes the vibration frequency, and the vertical axis denotes the amplitude-frequency response of the microphone to vibration. The vibrations may be generated by the vibration component in the speaker and may be transmitted to the microphone through the housing, a connection structure, or the like. The curves P1, P2, P3, and P4 may denote the amplitude-frequency response curves when the microphone is disposed at position 1601, position 1602, position 1603, and position 1604 in the housing 1600, respectively. As shown in FIG. 17B, the horizontal axis is the vibration frequency, and the vertical axis is the phase-frequency response of the microphone to vibration. The curves P1, P2, P3, and P4 may denote the phase-frequency response curves when the microphone is located at position 1601, position 1602, position 1603, and position 1604 in the housing, respectively.

Taking position 1601 as a reference, it may be seen that the amplitude-frequency response curve and phase-frequency response curve when the microphone is at position 1602 may be most similar to the amplitude-frequency response curve and phase-frequency response curve when the microphone is at position 1601. Secondly, the amplitude-frequency response curve and phase-frequency response curve when the microphone is located at the position 1604 may be relatively similar to the amplitude-frequency response curve and the phase-frequency response curve when the microphone is located at the position 1601. In some embodiments, without considering other factors such as a structure and a connection of the microphone and the vibration sensor, the microphone and the vibration sensor may be connected at close positions (e.g., adjacent positions) inside the housing, or at symmetrical positions (e.g., when the vibration component is located in the center of the housing, the microphone and the vibration sensor may be located at diagonal positions of the housing, respectively) relative to the vibration component inside the housing. In such cases, a difference between the amplitude-frequency response and/or phase-frequency response of the microphone and that of the vibration sensor may be minimized, thereby more effectively removing the vibration noise in the microphone.

Figure 18:
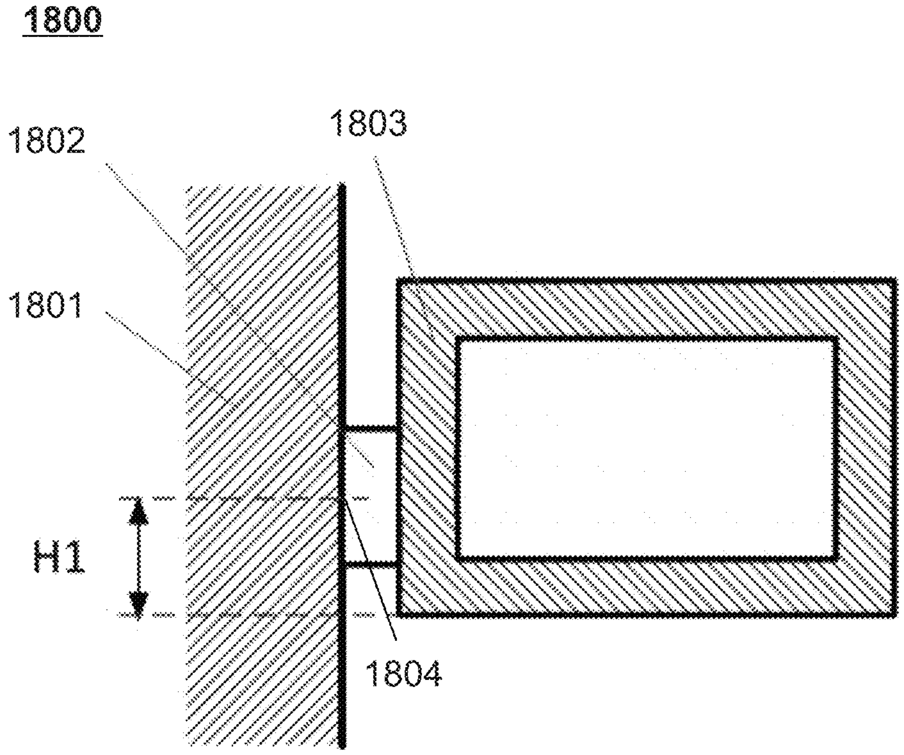
FIG. 18 is a schematic diagram illustrating a microphone or a vibration sensor connected to a housing according to some embodiments of the present disclosure.

FIG. 18 is a schematic diagram illustrating a microphone or a vibration sensor connected to a housing according to some embodiments of the present disclosure. For the purpose of illustration, the connection between the microphone and the housing may be described below as an example.

As shown in FIG. 18, a side wall of the microphone 1803 may be connected to a side wall 1801 of the housing through a connection structure 1802 and form a cantilever connection. The connection structure 1802 may fix the microphone 1803 and the side wall 1801 of the housing in an interference manner with a silicone sleeve, or directly connect the microphone 1803 and the side wall 1801 of the housing with glue (hard glue or soft glue). As shown in the figure, a contact point 1804 between a central axis of the connection structure 1802 and the side wall 1801 of the housing may be defined as a dispensing position. A distance between the dispensing position 1804 and a bottom of the microphone 1803 may be H1. The amplitude-frequency response and/or phase-frequency response of the microphone 1803 to vibration may vary with the change of the dispensing position.

Figure 19A:
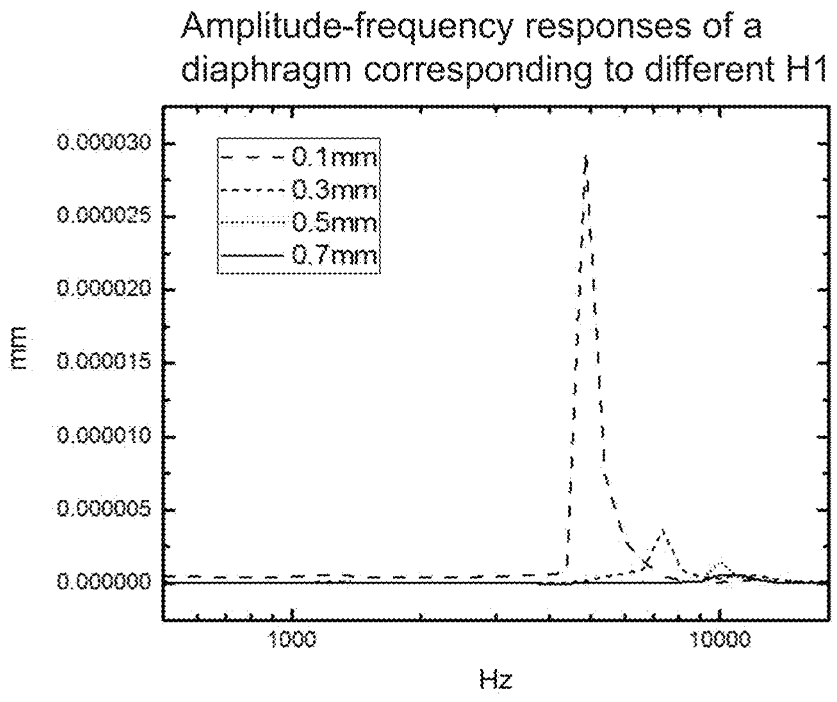
FIG. 19A is a schematic diagram illustrating amplitude-frequency response curves of a microphone or a vibration sensor connected to different positions on a housing according to some embodiments of the present disclosure.

FIG. 19A is a schematic diagram illustrating amplitude-frequency response curves of a microphone connected to different positions on a housing according to some embodiments of the present disclosure. As shown in FIG. 19A, the horizontal axis denotes the vibration frequency, and the vertical axis denotes the amplitude-frequency response of the microphone to vibrations of different frequencies. The vibrations may be generated by the vibration component in the speaker and transmitted to the microphone through the housing, the connection structure, or the like. As shown in the figure, when the distance H1 between the dispensing position and the bottom of the microphone is 0.1 mm, a peak value of the amplitude-frequency response of the microphone is the highest. When H1 is 0.3 mm, the peak value of the amplitude-frequency response may be lower than the peak value when H1 is 0.1 mm, and may move to high frequencies. When H1 is 0.5 mm, the peak value of the amplitude-frequency response may further drop and move to high frequencies. When H1 is 0.7 mm, the peak value of the amplitude-frequency response may further drop and move to the high frequencies. At this time, the peak value may almost drop to zero. It may be seen that the amplitude-frequency response of the microphone to vibration may change with the change of the dispensing position. In practical applications, the dispensing position may be flexibly selected according to actual requirements so as to obtain a microphone with a required amplitude-frequency response to vibration.

Figure 19B:
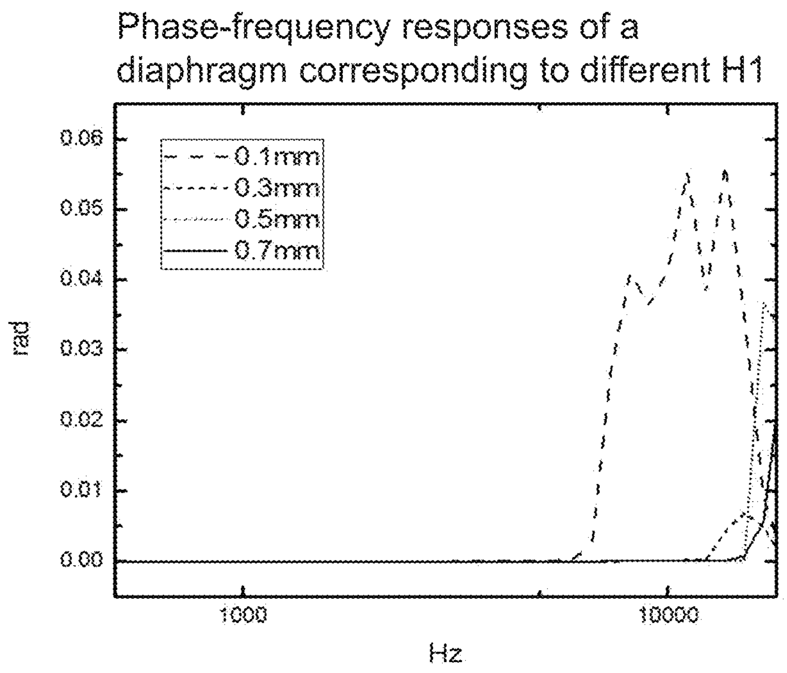
FIG. 19B is a schematic diagram illustrating phase-frequency response curves of a microphone or a vibration sensor connected to different positions on a housing according to some embodiments of the present disclosure.

FIG. 19B is a schematic diagram illustrating phase-frequency response curves of a microphone connected to different positions on a housing according to some embodiments of the present disclosure. As shown in FIG. 19B, the horizontal axis denotes the vibration frequency, and the vertical axis denotes the phase-frequency response of the microphone to vibrations of different frequencies. It may be seen from FIG. 19B that as the distance between the dispensing position and the bottom of the microphone increases, a vibration phase of the diaphragm of the microphone may change accordingly, and the position of the phase mutation may move to high frequencies. It may be seen that the phase-frequency response of the microphone to vibration may change with the change of the dispensing position. In practical applications, the dispensing position may be flexibly selected according to actual requirements to obtain a microphone with a required phase-frequency response to vibration.

Obviously, for those skilled in the art, in addition to the manner that the microphone is connected to the side wall of the housing, the microphone may also be connected to the housing in other manners or other positions. For example, the bottom of the microphone may be connected to the bottom of the inside of the housing (also referred to as "substrate connection").

Figure 20:
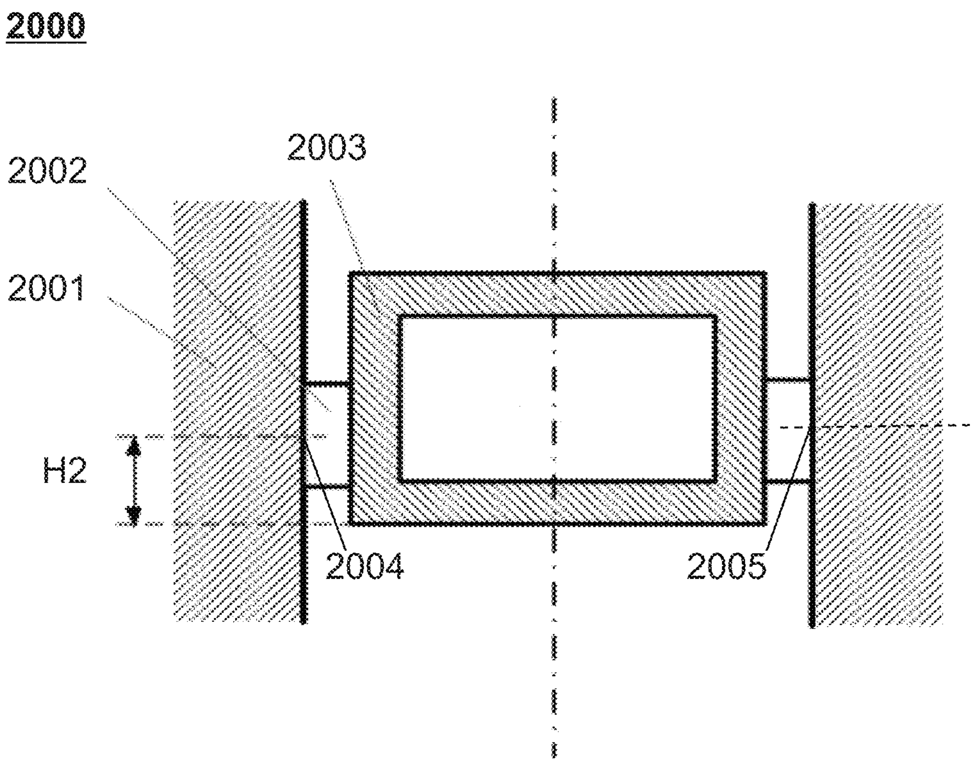
FIG. 20 is a schematic diagram illustrating a microphone or a vibration sensor connected to a housing according to some embodiments of the present disclosure.

In addition, the microphone may also be connected to the housing through a peripheral connection. For example, FIG. 20 is a schematic diagram illustrating a microphone connected to a housing through a peripheral connection according to some embodiments of the present disclosure. As shown in FIG. 20, at least two side walls of a microphone 2003 may be respectively connected to a housing 2001 through a connection structure 2002 and form a peripheral connection. The connection structure 2002 may be similar to the connection structure 1502, which is not repeated here. As shown in the figure, contact points 2004 and 2005 between a central axis of the connection structure 2002 and the housing may be dispensing positions, and a distance between the dispensing position and the bottom of the microphone 2003 may be H2. An amplitude-frequency response and/or phase-frequency response of the microphone 2003 to vibration may vary with the change of the dispensing position H2.

Figure 21A:
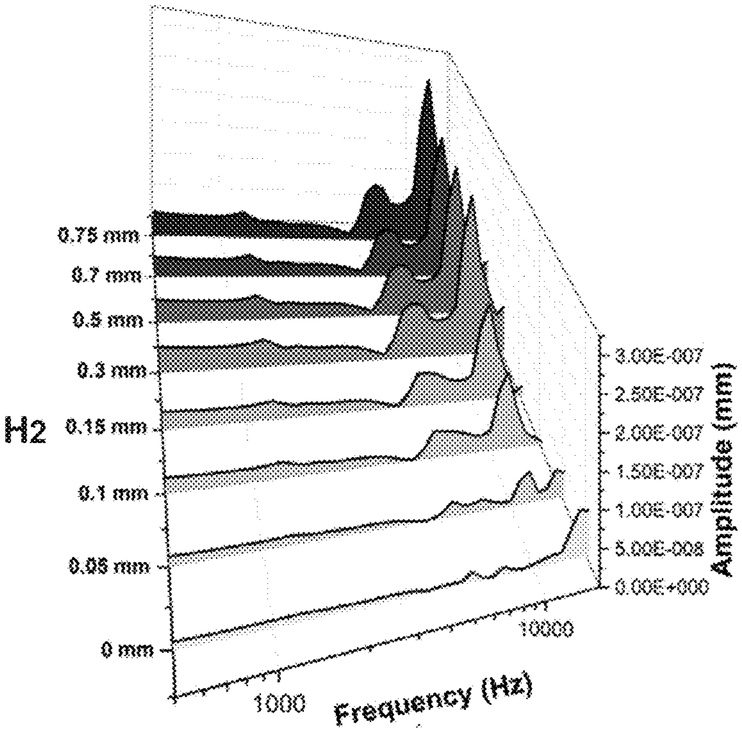
FIG. 21A is a schematic diagram illustrating amplitude-frequency response curves of a microphone or a vibration sensor connected to different positions on a housing according to some embodiments of the present disclosure.

FIG. 21A is a schematic diagram illustrating amplitude-frequency response curves of a microphone connected to different positions on a housing through a peripheral connection according to some embodiments of the present disclosure. As shown in FIG. 21A, the horizontal axis denotes the vibration frequency, and the vertical axis denotes the amplitude-frequency response of the microphone to vibrations of different frequencies. It may be seen from FIG. 21A that as the distance between the dispensing position and the bottom of the microphone increases, the peak value of the amplitude-frequency response of the microphone may gradually increase. It may be seen that when the microphone is connected to the housing through a peripheral connection, the amplitude-frequency response of the microphone to vibration may change with the change of the dispensing position. In practical applications, the dispensing position may be flexibly selected according to actual requirements to obtain a microphone with a required amplitude-frequency response to vibration.

Figure 21B:
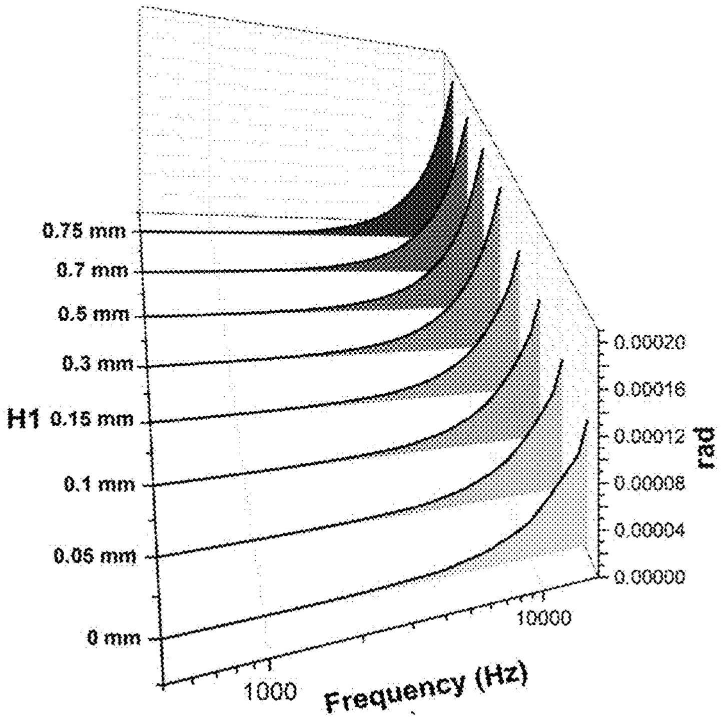
FIG. 21B is a schematic diagram illustrating phase-frequency response curves of a microphone or a vibration sensor connected to different positions on a housing according to some embodiments of the present disclosure.

FIG. 21B is a schematic diagram illustrating phase-frequency response curves of a microphone connected to different positions on a housing through a peripheral connection according to some embodiments of the present disclosure. As shown in FIG. 21B, the horizontal axis denotes the vibration frequency, and the vertical axis denotes the phase-frequency response of the microphone to vibrations of different frequencies. It may be seen from FIG. 21B that as the distance between the dispensing position and the bottom of the microphone increases, the vibration phase of the diaphragm of the microphone may also change, and the position of the phase mutation may move to high frequencies. It may be seen that when the microphone is connected to the housing through a peripheral connection, the phase-frequency response of the microphone to vibration may vary with the change of the dispensing position. In practical applications, the dispensing position may be flexibly selected according to actual requirements to obtain a microphone with a required phase-frequency response to vibration.

In some embodiments, in order to make the amplitude-frequency response/phase-frequency response of the vibration sensor to the vibration as consistent as possible with that of the microphone, the vibration sensor and the microphone may be connected in the housing in the same manner (e.g., one of a cantilever connection, a peripheral connection, or a substrate connection), and the respective dispensing positions of the vibration sensor and the microphone may be the same or as close as possible.

As described above, the amplitude-frequency response and/or phase-frequency response of the vibration sensor and/or the microphone to vibration may be related to the type of the microphone and/or the vibration sensor. By selecting an appropriate type of microphone and/or vibration sensor, the amplitude-frequency response and/or phase-frequency response of the microphone and the vibration sensor to vibration may be basically the same, such that the vibration signal obtained by the vibration sensor may be used to remove the vibration noise picked by the microphone.

Figure 22A:
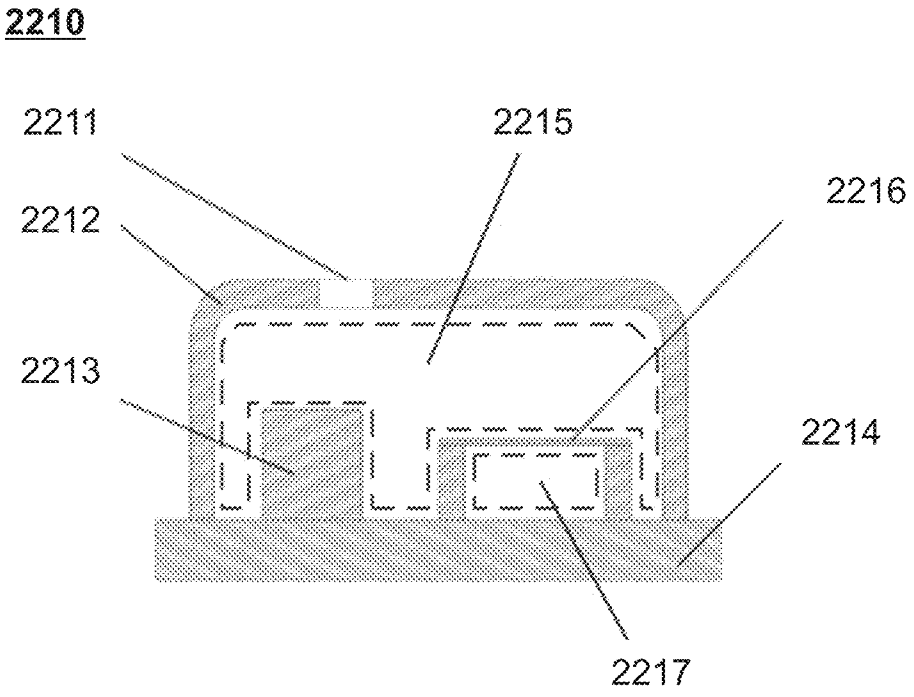
FIGS. 22A to 22C are schematic diagrams illustrating a structure of a microphone and a vibration sensor according to some embodiments of the present disclosure.

FIG. 22A is a schematic diagram illustrating a structure of an air conduction microphone 2210 according to some embodiments of the present disclosure. In some embodiments, the air conduction microphone 2210 may be a micro-electromechanical system (MEMS) microphone. MEMS microphones may have the characteristics of small size, low power consumption, high stability, and well consistency of amplitude-frequency and phase-frequency response. As shown in FIG. 22A, the air conduction microphone 2210 may include an opening 2211, a housing 2212, an integrated circuit (ASIC) 2213, a printed circuit board (PCB) 2214, a front cavity 2215, a diaphragm 2216, and a back cavity 2217. The opening 2211 may be located on one side of the housing 2212 (an upper side in FIG. 22A, that is, the top). The integrated circuit 2213 may be mounted on the PCB 2214. The front cavity 2215 and the back cavity 2217 may be separated and formed by the diaphragm 2216. As shown in the figure, the front cavity 2215 may include a space above the diaphragm 2216 and may be formed by the diaphragm 2216 and the housing 2212. The back cavity 2217 may include a space below the diaphragm 2216 and may be formed by the diaphragm 2216 and the PCB 2214. In some embodiments, when the air conduction microphone 2210 is placed in the speaker, air conduction sound in the environment (e.g., the user's voice) may enter the front cavity 2215 through the opening 2211 and cause vibration of the diaphragm 2216. At the same time, the vibration signal generated by the vibration component may cause vibration of the housing 2212 of the air conduction microphone 2210 through the housing, a connection structure, etc. of the speaker, thereby driving the diaphragm 2216 to vibrate, thereby generating a vibration noise signal.

In some embodiments, the air conduction microphone 2210 may be replaced by a manner in which the back cavity 2217 has an opening, and the front cavity 2215 is isolated from outside air.

Figure 22B:
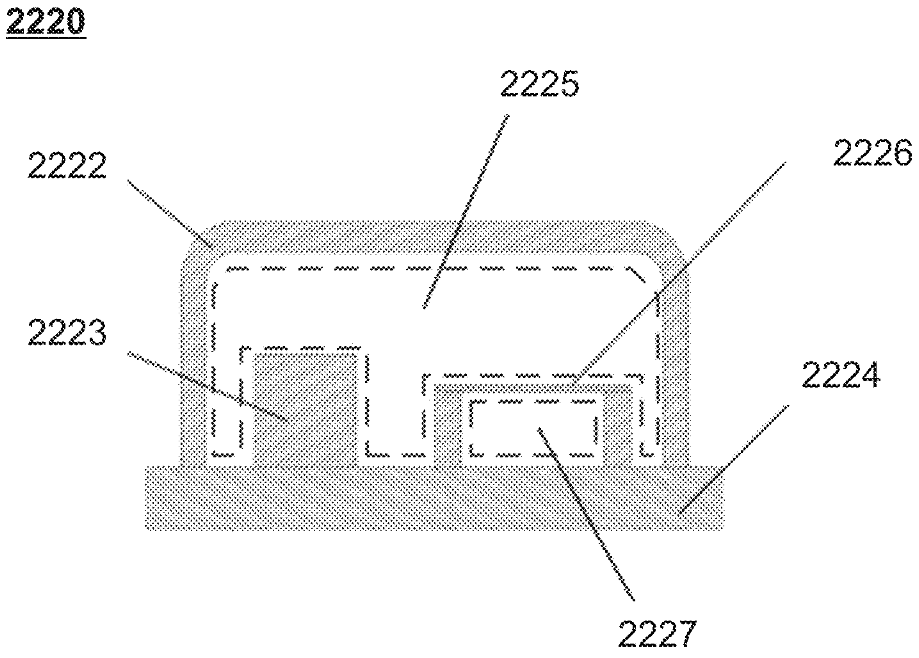

FIG. 22B is a schematic diagram illustrating a structure of a vibration sensor 2220 according to some embodiments of the present disclosure. As shown in FIG. 22B, the vibration sensor 2220 may include a housing 2222, an integrated circuit (ASIC) 2223, a printed circuit board (PCB) 2224, a front cavity 2225, a diaphragm 2226, and a back cavity 2227. In some embodiments, the vibration sensor 2220 may be obtained by closing the opening 2211 of the air conduction microphone in FIG. 22A (in the present disclosure, the vibration sensor 2220 may also be referred to as a closed microphone 2220). In some embodiments, when the closed microphone 2220 is placed in the speaker, air conduction sound in the environment (e.g., the user's voice) may not enter the closed microphone 2220 to cause the diaphragm 2226 to vibrate. The vibration generated by the vibration component may cause the housing 2222 of the enclosed microphone 2220 to vibrate through the housing, a connection structure, etc. of the speaker, and may further drive the diaphragm 2226 to vibrate to generate a vibration signal.

Figure 22C:
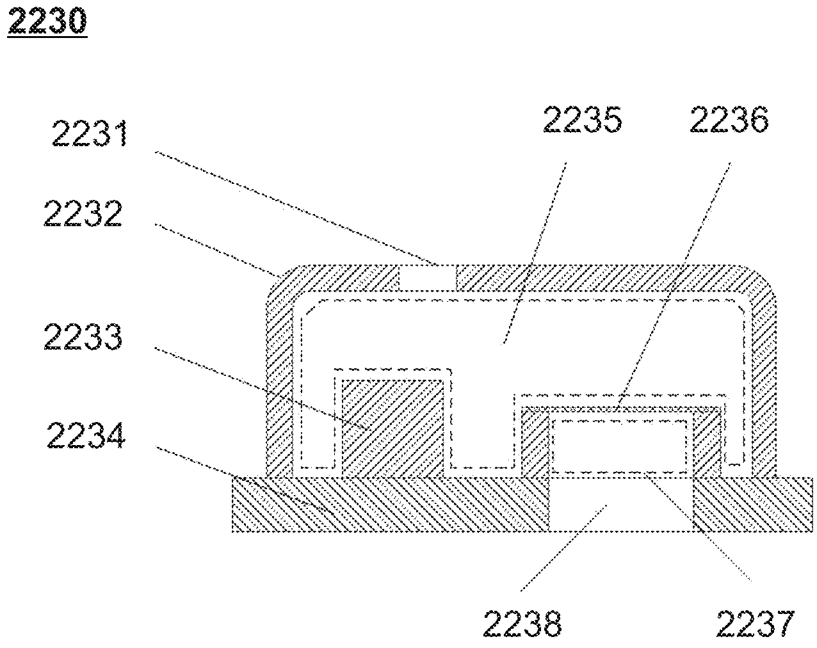

FIG. 22C is a schematic diagram illustrating a structure of a vibration sensor 2230 according to some embodiments of the present disclosure. As shown in FIG. 22C, the vibration sensor 2230 may include an opening 2231, a housing 2232, an integrated circuit (ASIC) 2233, a printed circuit board (PCB) 2234, a front cavity 2235, a diaphragm 2236, a back cavity 2237, and an opening 2238. In some embodiments, the vibration sensor 2230 may be obtained by punching a hole at a bottom of the back cavity 2237 of the air conduction microphone in FIG. 22A, such that the back cavity 2237 may communicate with the outside (in the present disclosure, the vibration sensor 2230 may also be referred to as a dual-link microphone 2230). In some embodiments, when the dual-link microphone 2230 is placed in the speaker, the air conduction sound in the environment (e.g., the user's voice) may enter the dual-link microphone 2230 through the opening 2231 and the opening 2238, such that air-conducted sound signals received on both sides of the diaphragm 2236 may offset each other. Therefore, the air-conducted sound signals may not cause obvious vibration of the diaphragm 2236. The vibration generated by the vibration component may cause the housing 2232 of the dual-link microphone 2230 to vibrate through the housing, a connection structure, etc. of the speaker, and may further drive the diaphragm 2236 to vibrate to generate a vibration signal.

The above descriptions of the air conduction microphone and the vibration sensor are only specific examples, and should not be regarded as the only feasible implementation. Obviously, for those skilled in the art, after understanding the basic principle of the microphone, it may be possible to make various modifications and changes to the specific structure of the microphone and/or the vibration sensor without departing from the principles. However, these modifications and changes are still within the scope described above. For example, for those skilled in the art, the opening 2211 or 2231 in the air conduction microphone 2210 or the vibration sensor 2230 may be arranged on a left or right side of the housing 2212 or the housing 2232, as long as the opening may facilitate communication between the front cavity 2215 or 2235 with the outside. Further, a count of openings may be not limited to one, and the air conduction microphone 2210 or the vibration sensor 2230 may include a plurality of openings similar to the openings 2211 or 2231.

In some embodiments, the vibration signal generated by the diaphragm 2226 or 2236 of the closed microphone 2220 or the dual-link microphone 2230 may be used to offset the vibration noise signal generated by the diaphragm 2216 of the air conduction microphone 2210. In some embodiments, in order to obtain a better effect of removing vibration and noise, it may be necessary to make the closed microphone 2220 or the dual-link microphone 2230 and the air conduction microphone 2210 have a same amplitude-frequency response or phase-frequency response to mechanical vibration of the housing of the speaker.

For illustration purposes only, the air conduction microphones and vibration component mentioned in FIG. 22A, FIG. 22B and FIG. 22C may be described as examples. A front cavity volume, a back cavity volume, and/or a cavity volume of the air conduction microphone or vibration sensor (e.g., the closed microphone 2220 or the dual-link microphone 2230) may be changed to make the air conduction microphone and the vibration sensor have the same or almost the same amplitude-frequency response and/or phase-frequency response to vibration, thereby removing vibration and noises. The cavity volume herein refers to a sum of the front cavity volume and the back cavity volume of the microphone or the closed microphone. In some embodiments, when the amplitude-frequency response and/or phase-frequency response of the vibration sensor to vibration of the housing of the speaker is consistent with that of the air conduction microphone, the cavity volume of the vibration sensor may be regarded as the "equivalent volume" of the cavity volume of the air conduction microphone 2210. In some embodiments, a closed microphone with a cavity volume that is the equivalent volume of the air conduction microphone cavity volume may be selected to facilitate the removal of the vibration noise signal of the air conduction microphone.

Figure 23A:
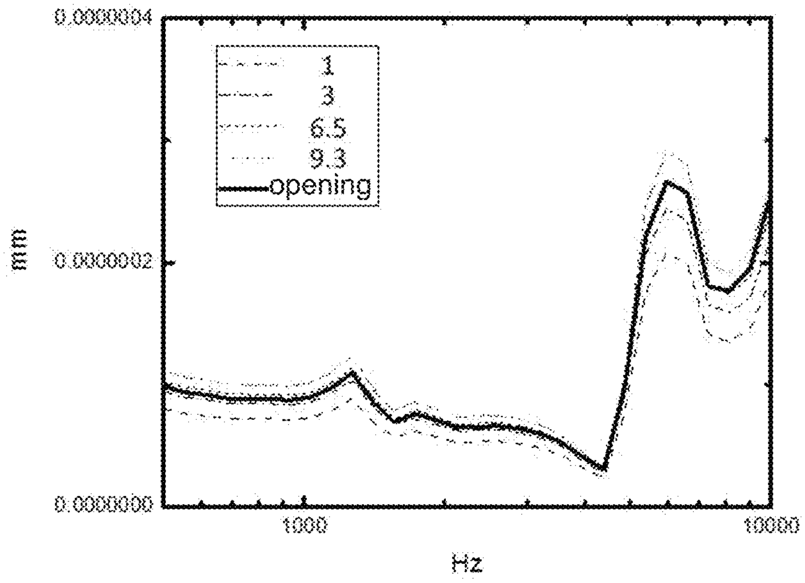
FIG. 23A is a schematic diagram illustrating amplitude-frequency response curves of a vibration sensor with different cavity heights according to some embodiments of the present disclosure.

FIG. 23A is a schematic diagram illustrating amplitude-frequency response curves of a vibration sensor with different cavity volumes according to some embodiments of the present disclosure. In some embodiments, the amplitude-frequency response curves of the vibration sensors with different cavity volumes to vibration may be obtained through finite element calculation methods or actual measurements. For example, the vibration sensor may be a closed microphone, and a bottom of the vibration sensor may be installed inside the housing. As shown in FIG. 23A, the horizontal axis denotes the vibration frequency, and the vertical axis denotes the amplitude-frequency response of the closed microphone to vibrations of different frequencies. The vibration may be generated by the vibration component in the speaker, and may be transmitted to the air conduction microphone or the vibration sensor through the housing and a connection structure. The solid line denotes the amplitude-frequency response curve of the air conduction microphone to vibration. The dotted lines denote the amplitude-frequency response curves of the closed microphone to vibration when a volume ratio of the closed microphone to the air conduction microphone cavity is 1:1, 3:1, 6.5:1, and 9.3:1. When the volume ratio is 1:1, the overall amplitude-frequency response curve of the closed microphone may be lower than that of the air conduction microphone. When the volume ratio is 3:1, the amplitude-frequency response curve of the closed microphone may increase, but the overall amplitude-frequency response curve may be still slightly lower than that of the air conduction microphone. When the volume ratio is 6.5:1, the overall amplitude-frequency response curve of the closed microphone may be slightly higher than that of the air conduction microphone. When the cavity volume ratio is 9.3:1, the overall amplitude-frequency response curve of the closed microphone may be higher than that of the air conduction microphone. It may be seen that when the cavity volume ratio is between 3:1 and 6.5:1, the amplitude-frequency response curves of the closed microphone and the air conduction microphone may be basically the same. Therefore, it may be considered that a ratio of the equivalent volume (i.e., the cavity volume of the closed microphone) to the cavity volume of the air conduction microphone may be between 3:1 and 6.5:1. In some embodiments, when the vibration sensor (e.g., the closed microphone 2220) and the air conduction microphone (e.g., the air conduction microphone 2210) receive vibration signals from a same vibration source, and a ratio of the cavity volume of the vibration sensor to the cavity volume of the air conduction microphone is between 3:1 and 6.5:1, the vibration sensor may help remove the vibration signal received by the air conduction microphone.

Figure 23B:
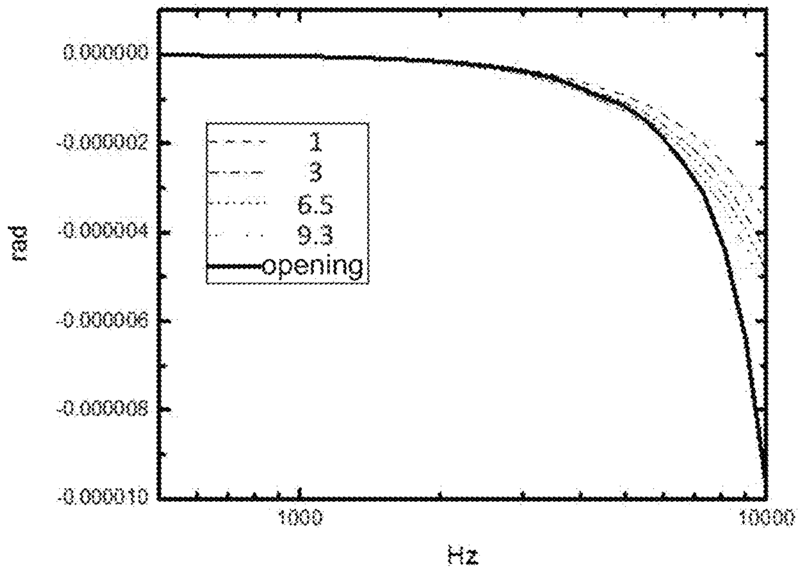
FIG. 23B is a schematic diagram illustrating phase-frequency response curves of a vibration sensor with different cavity heights according to some embodiments of the present disclosure.

Similarly, FIG. 23B is a schematic diagram illustrating phase-frequency response curves of a vibration sensor with different cavity heights according to some embodiments of the present disclosure. As shown in FIG. 23B, the horizontal axis denotes the vibration frequency, and the vertical axis denotes the phase-frequency response of the closed microphone to vibration of different frequencies. As shown in FIG. 23B, the solid line denotes the phase-frequency response curve of the air conduction microphone to vibration. The dotted lines denote the phase-frequency response curves of the closed microphone to vibration when a volume ratio of the closed microphone to the air conduction microphone cavity is 1:1, 3:1, 6.5:1, and 9.3:1. In some embodiments, when the closed microphone (e.g., the closed microphone 2220) and the air conduction microphone (e.g., the air conduction microphone 2210) receive vibration signals from the same vibration source, and a ratio of the cavity volume of the closed microphone to the cavity volume of the air conduction microphone is greater than 3:1, the closed microphone may help remove the vibration signal received by the air conduction microphone.

The above description of the equivalent volume of the air conduction microphone cavity volume is only a specific example, and should not be regarded as the only feasible implementation. Obviously, for those skilled in the art, after understanding the basic principles of air conduction microphones, it may be possible to make various modifications and changes to the specific structure of the microphone and/or vibration sensor without departing from the principles. However, these modifications and changes are still within the scope described above. For example, the equivalent volume of the cavity volume of the air conduction microphone may be changed through the modification of the structure of the air conduction microphone or the vibration sensor, as long as a closed microphone with a suitable cavity volume is selected to achieve the purpose of removing vibration and noises.

As described above, when the air conduction microphone has different structures, the equivalent volume of the cavity volume thereof may also be different. In some embodiments, factors affecting the equivalent volume of the cavity volume of the air conduction microphone may include the front cavity volume, the back cavity volume, the position of the opening, and/or the sound source transmission path of the air conduction microphone. Alternatively, in some embodiments, the equivalent volume of the front cavity volume of the air conduction microphone may be used to characterize the front cavity volume of the vibration sensor. The equivalent volume of the front cavity volume of the microphone herein may be described as when the back cavity volume of the vibration sensor is the same as the back cavity volume of the air conduction microphone, and the amplitude-frequency response and/or phase-frequency response of the vibration sensor to vibration of the housing of the speaker is consistent with that of the air conduction microphone, the front cavity volume of the vibration sensor may be the "equivalent volume" of the front cavity volume of the air conduction microphone. In some embodiments, a closed microphone with a back cavity volume equal to the back cavity volume of the air conduction microphone, and a front cavity volume being the equivalent volume of the front cavity volume of the air conduction microphone may be selected so as to help remove the vibration noise signal of the air conduction microphone.

When the air conduction microphone has different structures, the equivalent volume of the front cavity volume may also be different. In some embodiments, factors affecting the equivalent volume of the front cavity volume of the air conduction microphone may include the front cavity volume, the back cavity volume, the position of the opening, and/or the sound source transmission path of the air conduction microphone.

Figure 24A:
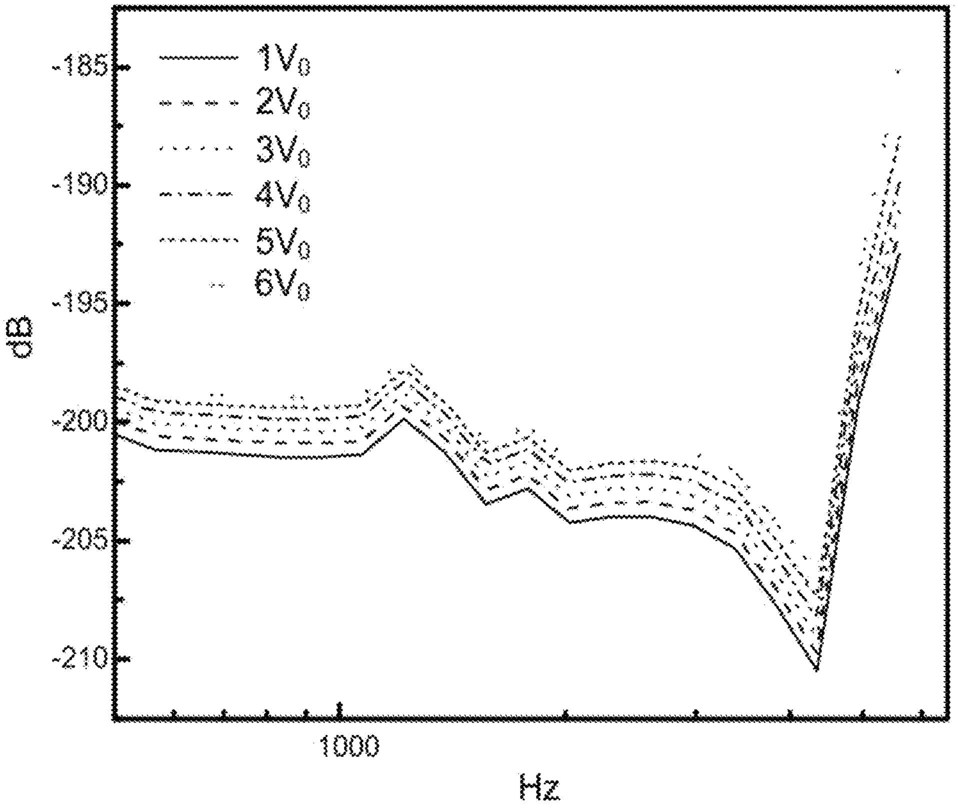
FIG. 24A is a schematic diagram illustrating amplitude-frequency response curves of an air conduction microphone when a front cavity volume changes according to some embodiments of the present disclosure.

FIG. 24A is a schematic diagram illustrating amplitude-frequency response curves of an air conduction microphone when a front cavity volume changes according to some embodiments of the present disclosure. In some embodiments, the amplitude-frequency response curves of the air conduction microphones with different front cavity volumes to vibration may be obtained through finite element calculation methods or actual measurements. As shown in FIG. 24A, the horizontal axis denotes the vibration frequency, and the vertical axis denotes the amplitude-frequency response of the air conduction microphone to vibrations of different frequencies. $V_0$ denotes the front cavity volume of the air conduction microphone. As shown in FIG. 24A, the solid line denotes the amplitude-frequency response curve of the air conduction microphone when the front cavity volume is $V_0$, and the dotted lines denote the amplitude-frequency response curves of the air conduction microphone when the front cavity volume is $2V_0$, $3V_0$, $4V_0$, $5V_0$, and $6V_0$, respectively. It may be seen from the figure that as the front cavity volume of the air conduction microphone increases, the amplitude of the diaphragm of the air conduction microphone may increase, and the diaphragm may be more likely to vibrate.

For air conduction microphones with different front cavity volumes, the equivalent volume of the front cavity volume of each air conduction microphone may be determined according to the corresponding amplitude-frequency response curve. In some embodiments, the equivalent volume of the front cavity volume may be determined according to a method similar to FIG. 23A. For example, according to the corresponding amplitude-frequency response curves in FIG. 24A, an equivalent volume of the front cavity volume of an air conduction microphone with a front cavity volume of 2 $V_0$ may be determined as 6.7 $V_0$ using the method of FIG. 23A. That is, when the back cavity volume of the vibration sensor is equal to the back cavity volume of the air conduction microphone, the front cavity volume of the vibration sensor is 6.7 $V_0$, and the front cavity volume of the air conduction microphone is 2 $V_0$, the amplitude-frequency response of the vibration sensor to vibration may be the same as that of the air conduction microphone. As shown in Table 1, as the front cavity volume increases, the equivalent volume of the front cavity volume of the air conduction microphone may also increase.

TABLE 1

Equivalent volumes corresponding to different front cavity volumes

| Front Cavity Volume | 1 $V_0$ | 2 $V_0$ | 3 $V_0$ | 4 $V_0$ | 5 $V_0$ |
|---|---|---|---|---|---|
| Equivalent Volume | 4 $V_0$ | 6.7 $V_0$ | 8 $V_0$ | 9.3 $V_0$ | 12 $V_0$ |

Figure 24B:
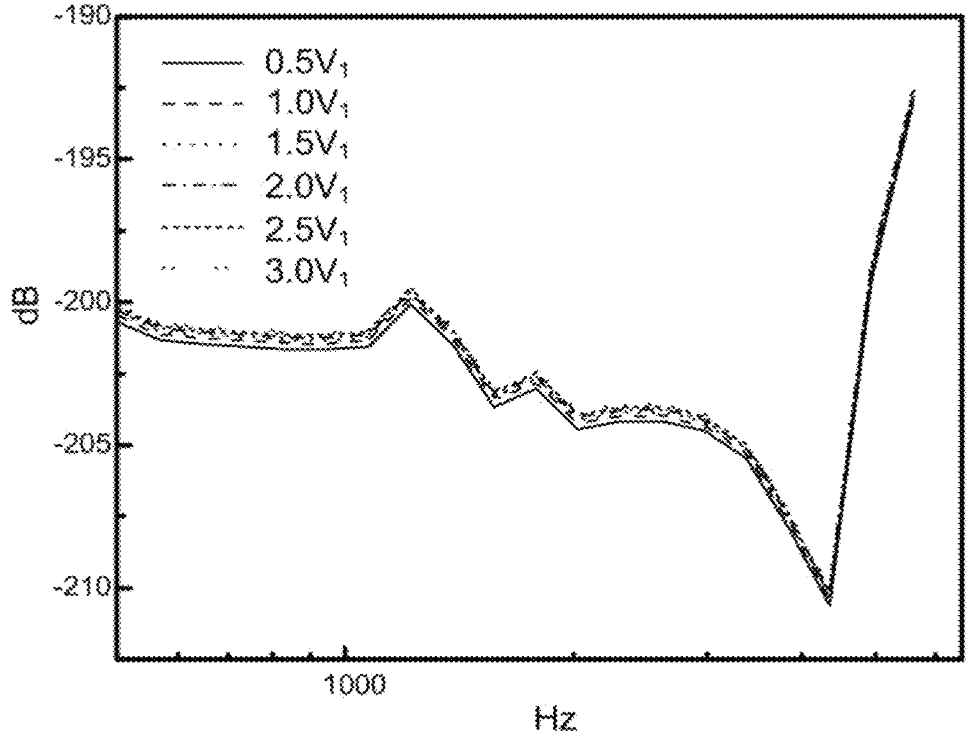
FIG. 24B is a schematic diagram illustrating amplitude-frequency response curves of an air conduction microphone when a back cavity volume changes according to some embodiments of the present disclosure.

Similarly, FIG. 24B is a schematic diagram illustrating amplitude-frequency response curves of an air conduction microphone when a back cavity volume changes according to some embodiments of the present disclosure. In some embodiments, the amplitude-frequency response curves of the air conduction microphones with different back cavity volumes to vibration may be obtained through finite element calculation methods or actual measurements. As shown in FIG. 24B, the horizontal axis denotes the vibration frequency, and the vertical axis denotes the amplitude-frequency response of the air conduction microphone to vibrations of different frequencies. $V_1$ denotes the back cavity volume of the air conduction microphone. As shown in FIG. 24B, the solid line denotes the amplitude-frequency response curve of the air conduction microphone when the back cavity volume is 0.5 $V_1$, and the dotted lines denote the amplitude-frequency response curves of the air conduction microphone when the back cavity volume is 1 $V_1$, 1.5 $V_1$, 2 $V_1$, 2.5 $V_1$, and 3 $V_1$, respectively. It may be seen from the figure that as the volume of the back cavity of the air conduction microphone increases, the amplitude of the diaphragm of the air conduction microphone may increase, and the diaphragm may be more likely to vibrate. For air conduction microphones with different back cavity volumes, the equivalent volume of the front cavity volume of each air conduction microphone may be determined according to the corresponding amplitude-frequency response curve. In some embodiments, the equivalent volume of the front cavity volume may be determined according to a method similar to FIG. 23A. For example, according to the solid line shown in FIG. 24B, an equivalent volume of a front cavity volume of an air conduction microphone with a back cavity volume of 0.5 $V_1$ may be determined as 3.5 $V_0$ using the method of FIG. 23A. That is, when the back cavity volumes of the air conduction microphone and the vibration sensor are both 0.5 $V_1$, the front cavity volume of the vibration sensor is 3.5 $V_0$, and the front cavity volume of the air conduction microphone is 1 $V_0$, the amplitude-frequency response of the vibration sensor to vibration may be the same as that of the air conduction microphone. As another example, when the back cavity volumes of the air conduction microphone and the vibration sensor are both 3.0 $V_1$, the front cavity volume of the vibration sensor is 7 $V_0$, and the front cavity volume of the air conduction microphone is 1 $V_0$, the amplitude-frequency-frequency response of the vibration sensor to vibration may be the same as that of the air conduction microphone. When the front cavity volume of the air conduction microphone remains unchanged at 1 $V_0$ and the back cavity volume increases from 0.5 $V_1$ to 3.0 $V_1$, the equivalent volume of the front cavity volume of the air conduction microphone may increase from 3.5 $V_0$ to 7 $V_0$.

Figure 25:
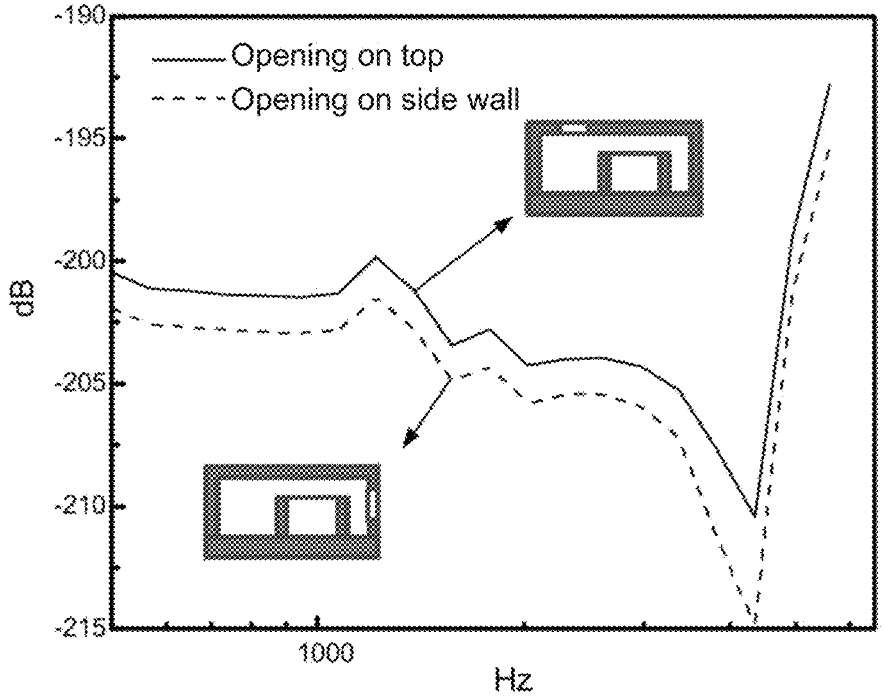
FIG. 25 is a schematic diagram illustrating amplitude-frequency response curves of a microphone with different opening positions according to some embodiments of the present disclosure.

In some embodiments, a position of the opening on the housing of the air conduction microphone may also affect the equivalent volume of the front cavity volume of the air conduction microphone. FIG. 25 is a schematic diagram illustrating amplitude-frequency response curves of a diaphragm corresponding to different opening positions according to some embodiments of the present disclosure. In some embodiments, the amplitude-frequency response curves of the air conduction microphone with different opening positions may be obtained through a finite element calculation method or actual measurement. As shown in the figure, the horizontal axis denotes the vibration frequency, and the vertical axis denotes the amplitude-frequency response of air conduction microphones with different opening positions to vibration. As shown in FIG. 25, the solid line denotes the amplitude-frequency response curve of the air conduction microphone with the opening on the top of the housing, and the dotted line denotes the amplitude-frequency response curve of the air conduction microphone with the opening on the side wall of the housing. It may be seen that the overall amplitude-frequency response of the air conduction microphone when the opening is on the top is higher than that of the air conduction microphone when the opening is on the side wall. In some embodiments, for air conduction microphones with different opening positions, the equivalent volume of a corresponding front cavity volume may be determined according to the corresponding amplitude-frequency response curve. The method for determining the equivalent volume of the front cavity volume may be same as the method in FIG. 23A.

In some embodiments, the equivalent volume of the front cavity volume of the air conduction microphone with the opening at the top of the housing is greater than the equivalent volume of the front cavity volume of the air conduction microphone with the opening at the side wall. For example, the front cavity volume of the air conduction microphone with the top opening may be 1 $V_0$, the equivalent volume of the front cavity volume may be 4$V_0$, and the equivalent volume of the front cavity volume of the air conduction microphone in a same size with an opening on the side wall may be about 1.5 $V_0$. The same size means that the front cavity volume and the back cavity volume of the air conduction microphone with an opening on the side wall may be respectively equal to the front cavity volume and the back cavity volume of the air conduction microphone with an opening on the top.

In some embodiments, transmission paths of the vibration source may be different, and the equivalent volumes of the front cavity volume of the air conduction microphone may also be different. In some embodiments, the transmission path of the vibration source may be related to the connection manner between the microphone and the housing of the speaker, and different connection manners between the microphone and the housing of the speaker may correspond to different amplitude-frequency responses. For example, when the microphone is connected in the housing through a peripheral connection, the amplitude-frequency response to vibration may be different from that of a side wall connection.

Figure 26:
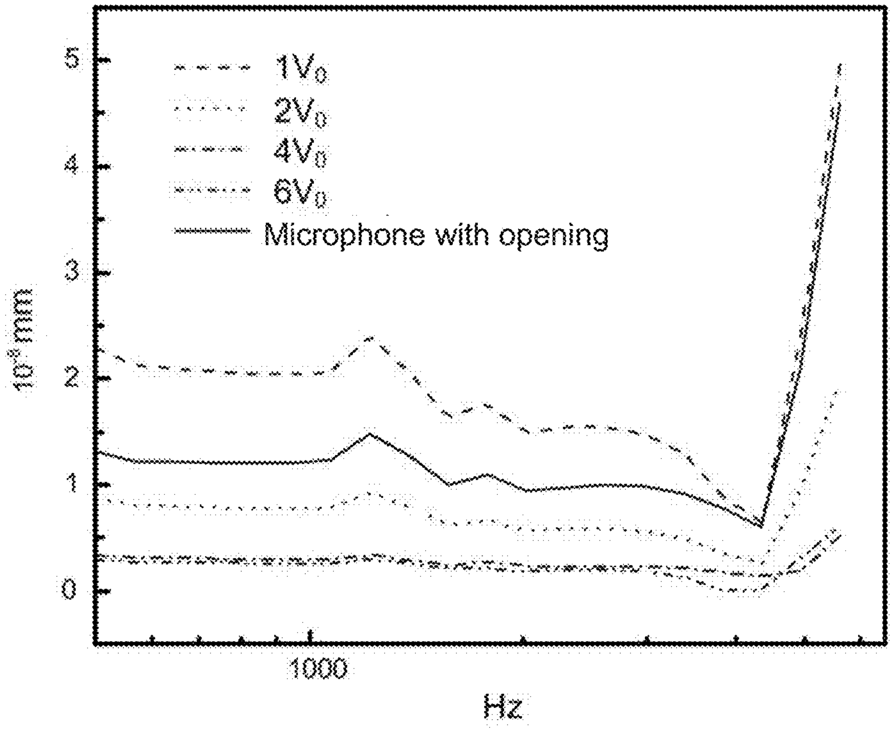
FIG. 26 is a schematic diagram illustrating amplitude-frequency response curves of an air conduction microphone and a fully enclosed microphone in a peripheral connection with a housing to vibration when a front cavity volume changes according to some embodiments of the present disclosure.

Different from the substrate connection to the housing in FIG. 23, FIG. 26 is a schematic diagram illustrating amplitude-frequency response curves of an air conduction microphone and a fully enclosed microphone in a peripheral connection with a housing to vibration when a front cavity volume changes according to some embodiments of the present disclosure. It should be noted that when discussing the front cavity volume of the air conduction microphone or the equivalent volume of the cavity volume, the connection manner of the air conduction microphone may be the same as the connection manner of the vibration sensor having a corresponding equivalent volume (an equivalent volume of the front cavity volume or an equivalent volume of the cavity volume). For example, in FIG. 20, FIG. 21 and FIG. 26, the air conduction microphone and the vibration sensor may be connected to the housing through a peripheral connection. As another example, the air conduction microphone and the vibration sensor in other embodiments of the present disclosure may be connected to the housing through a substrate connection, a peripheral connection, or other connection manners. In some embodiments, the amplitude-frequency response curve of the air conduction microphone and the fully enclosed microphone in a peripheral connection with a housing to vibration may be obtained through a finite element calculation method or actual measurement. As shown in FIG. 26, the solid line denotes the amplitude-frequency response curve of the air conduction microphone to vibration when the front cavity volume is $V_0$ and the air conduction microphone is connected to the housing through a peripheral connection. The dotted lines denote the amplitude-frequency response curves of the fully enclosed microphone to vibration when the fully enclosed microphone is connected to the housing through a peripheral connection and the front cavity volume is 1 $V_0$, 2 $V_0$, 4 $V_0$, 6 $V_0$, respectively. When the air conduction microphone with a front cavity volume of 1 $V_0$ is connected to the housing through a peripheral connection, the overall amplitude-frequency response curve may be lower than that of the fully enclosed microphone with a front cavity volume of 1 $V_0$ connected to the housing through a peripheral connection. When a fully enclosed microphone with a front cavity volume of 2 $V_0$ is connected to the housing through a peripheral connection, the overall amplitude-frequency response curve may be lower than that of the air conduction microphone with a front cavity volume of 1 $V_0$ connected to the housing through a peripheral connection. When the fully enclosed microphones with a front cavity volume of 4 $V_0$ and 6 $V_0$ are connected to the housing through a peripheral connection, the amplitude-frequency response curves may continue to decrease, which may be lower than the amplitude-frequency response curve of the air conduction microphone with a front cavity volume of 1 $V_0$ connected to the housing through a peripheral connection. It may be seen from the figure that when the front cavity volume of the fully closed microphone is between 1 $V_0$-2 $V_0$, the amplitude-frequency response curve of the fully closed microphone connected to the housing through a peripheral connection may be closest to the amplitude-frequency response curve of the air conduction microphone connected to the housing through a side wall connection. It may be concluded that if the air conduction microphone and the closed microphone are both connected to the housing through peripheral connections, the equivalent volume of the front cavity volume of the air conduction microphone may be between 1 $V_0$-2 $V_0$.

Figure 27:
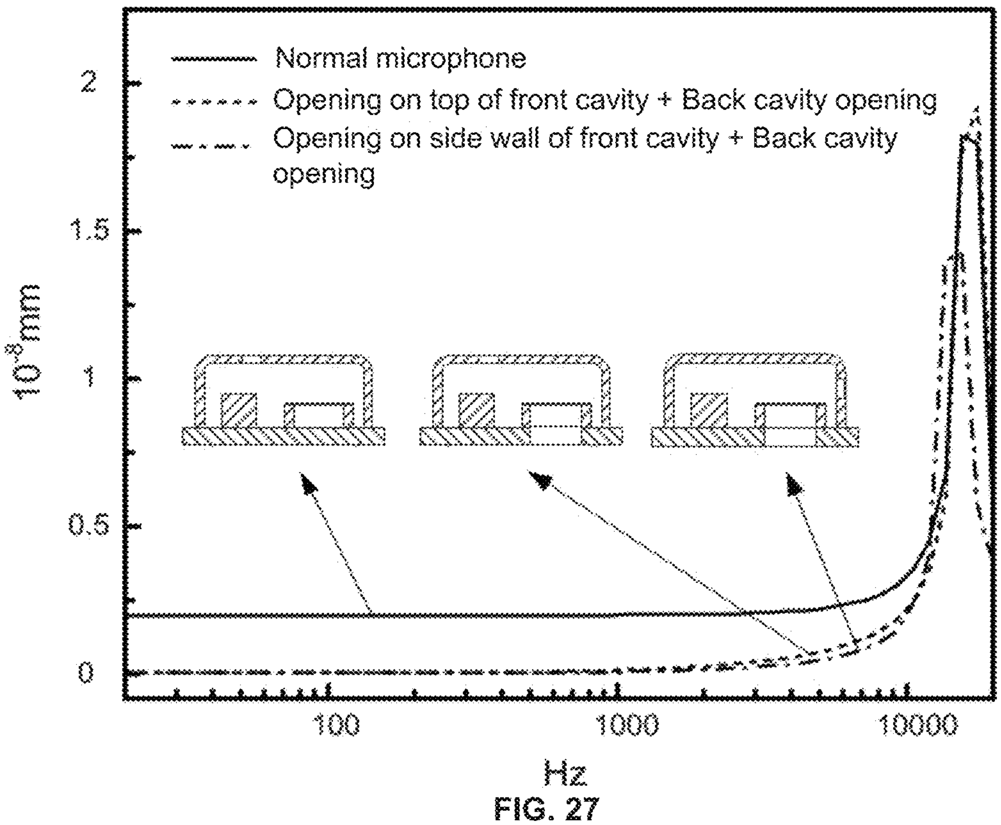
FIG. 27 is a schematic diagram illustrating amplitude-frequency response curves of an air conduction microphone and two dual-link microphones to an air-conducted sound signal according to some embodiments of the present disclosure.

FIG. 27 is a schematic diagram illustrating amplitude-frequency response curves of an air conduction microphone and two dual-link microphones to an air-conducted sound signal according to some embodiments of the present disclosure. Specifically, the solid line corresponds to the amplitude-frequency response curve of the air conduction microphone, and the dotted line corresponds to the amplitude-frequency response curve of the dual-link microphone with an opening on the top of the housing and the dual-link microphone with an opening on the side wall, respectively. As shown by the dotted line in the figure, when the frequency of the air-conducted sound signal is less than 5 kHz, the dual-link microphone may not respond to the air-conducted sound signal. When the frequency of the air-conducted sound signal exceeds 10 kHz, since a wavelength of the air-conducted sound signal gradually approaches a characteristic length of the dual-link microphone, and at the same time, a frequency of the air-conducted sound signal is close to or reaches a characteristic frequency of the diaphragm structure, the diaphragm may be caused to resonate to generate a relatively high amplitude, at this time the dual-link microphone may respond to the air-conducted sound signal. The characteristic length of the dual-link microphone herein may be a size of the dual-link microphone in one dimension. For example, when the dual-link microphone is a cuboid or approximately a cuboid, the characteristic length may be a length, a width or a height of the dual-link microphone. As another example, when the dual-link microphone is a cylinder or approximately a cylinder, the characteristic length may be a diameter or a height of the dual-link microphone. In some embodiments, the wavelength of the air-conducted sound signal is close to the characteristic length of a dual-link microphone, which may be understood as the wavelength of the air-conducted sound signal and the characteristic length of the dual-link microphone are on the same order of magnitude (e.g., on the order of mm). In some embodiments, a frequency band of voice communication may be in a range of 500 Hz-3400 Hz. The dual-link microphone may be insensitive to air-conducted sound in this range and may be used to measure vibration noise signals. Compared with closed microphones, the dual-link microphone may have better isolation effects on air-conducted sound signals in low frequency bands. In such cases, a dual-link microphone with a hole on the top of the housing or a side wall may be used as a vibration sensor to help remove the vibration noise signal in the air conduction microphone.

Figure 28:
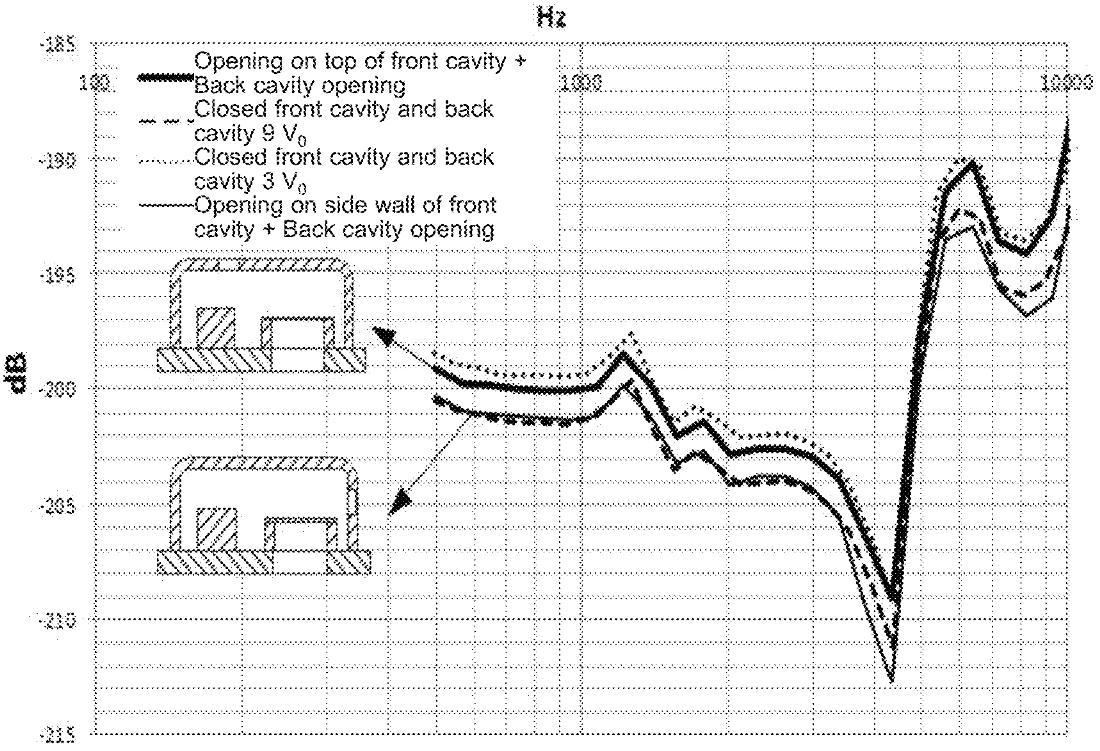
FIG. 28 is a schematic diagram illustrating amplitude-frequency response curves of a vibration sensor to vibration according to some embodiments of the present disclosure.

FIG. 28 is a schematic diagram illustrating amplitude-frequency response curves of a vibration sensor to vibration according to some embodiments of the present disclosure. The vibration sensor may include a closed microphone and a dual-link microphone. Specifically, FIG. 28 shows the amplitude-frequency response curves of two closed microphones and two dual-link microphones to vibration. As shown in FIG. 28, the thick solid line denotes the amplitude-frequency response curve of the dual-link microphone with a front cavity volume of 1 $V_0$ and an opening on the top to vibration, and the thin solid line denotes the amplitude-frequency response curve of the dual-link microphone with a front cavity volume of 1 $V_0$ and an opening on the side wall to vibration. The two dotted lines denote the amplitude-frequency response curves of closed microphones with front cavity volumes of 9 $V_0$ and 3 $V_0$ to vibration, respectively. It may be seen from the figure that the dual-link microphone with a front cavity volume of 1 $V_0$ and an opening on the side wall may be approximately "equivalent" to the closed microphone with a front cavity volume of 9 $V_0$. The dual-link microphone with a front cavity volume of 1 $V_0$ and an opening on the top may be approximately "equivalent" to the closed microphone with a front cavity volume of 3 $V_0$. Therefore, a dual-link microphone with a small volume may be used instead of a fully enclosed microphone with a large volume. In some embodiments, dual-link microphones and closed microphones that are "equivalent" or approximately "equivalent" to each other may be used interchangeably.

Example 1

Figure 29:
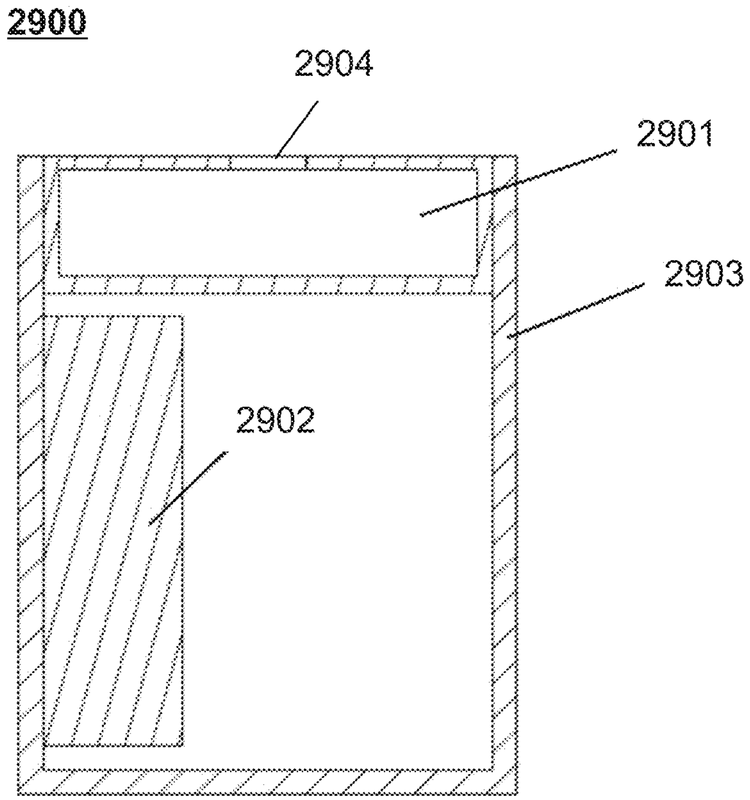
FIG. 29 is a schematic diagram illustrating a structure of a dual-microphone speaker according to some embodiments of the present disclosure.

As shown in FIG. 29, the speaker 2900 may include an air conduction microphone 2901, a bone conduction microphone 2902, and a housing 2903. As used herein, a sound hole 2904 of the air conduction microphone 2901 may communicate with the air outside the speaker 2900, and a side of the air conduction microphone 2901 may be connected to a side surface inside the housing 2903. The bone conduction microphone 2902 may be bonded to a side surface of the housing 2903. The air conduction microphone 2901 may obtain an air conduction sound signal through the sound hole 2904, and obtain a first vibration signal (i.e., a vibration noise signal) through a connection structure between the side and the housing 2903. The bone conduction microphone 2902 may obtain a second vibration signal (i.e., a mechanical vibration signal transmitted by the housing 2903). Both the first vibration signal and the second vibration signal may be generated by vibration of the housing 2903. In particular, because of the large differences between structures of the bone conduction microphone 2902 and the air conduction microphone 2901, the amplitude-frequency response and phase-frequency response of the two microphones may be different, the signal processing method shown in FIG. 15A may be used to remove the vibration and noise signals.

Example 2

Figure 30:
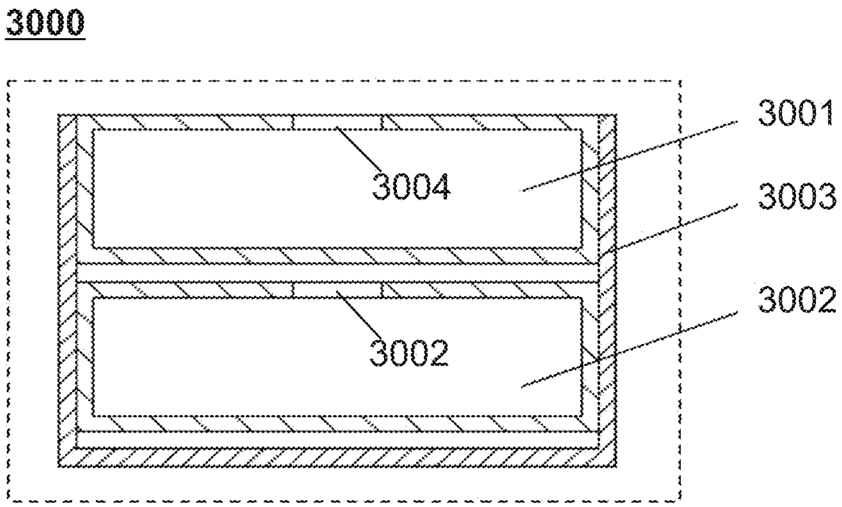
FIG. 30 is a schematic diagram illustrating a structure of a dual-microphone assembly according to some embodiments of the present disclosure.

As shown in FIG. 30, a dual-microphone assembly 3000 may include an air conduction microphone 3001, a closed microphone 3002, and a housing 3003. In some embodiments, a speaker (assembly) having two microphones may also be referred to as a dual-microphone speaker (assembly). As used herein, the air conduction microphone 3001 and the closed microphone 3002 may be an integral component, and outer walls of the two microphones may be bonded to an inner side of the housing 3003, respectively. The sound hole 3004 of the air conduction microphone 3001 may communicate with the air outside the dual-microphone assembly 3000, and a sound hole 3002 of the closed microphone 3002 may be located at the bottom of the air conduction microphone 3001 and isolated from the outside air (equivalent to the closed microphone in FIG. 22B). In particular, the closed microphone 3002 may use an air conduction microphone that is exactly the same as the air conduction microphone 3001, and from a closed structure in which the closed microphone 3002 does not communicate with the outside air through a structural design. The integrated structure may make the air conduction microphone 3001 and the enclosed microphone 3002 have the same vibration transmission path relative to a vibration source (e.g., the vibration component 1401 in FIG. 14), such that the air conduction microphone 3001 and the enclosed microphone 3002 may receive the same vibration signal. The air conduction microphone 3001 may obtain an air conduction sound signal through the sound hole 3004, and obtain a first vibration signal (i.e., a vibration noise signal) through the housing 3003. The closed microphone 3002 may only obtain the second vibration signal (i.e., the mechanical vibration signal transmitted by the housing 3003). Both the first vibration signal and the second vibration signal may be generated by vibration of the housing 2903. In particular, a front cavity volume, a back cavity volume, and/or a cavity volume of the enclosed microphone 3002 may be determined accordingly to an equivalent volume of a corresponding volume (a front cavity volume, a back cavity volume, and/or a cavity volume) of the air conduction microphone 3001 such that the air conduction microphone 3001 and the closed microphone 3002 may have the same or approximately the same frequency response. The dual-microphone assembly 3000 may have the advantage of small volume, and may be individually debugged and obtained through a simple production process. In some embodiments, the dual-microphone assembly 3000 may remove vibration and noises in all communication frequency bands received by the air conduction microphone 3001.

Figure 31:
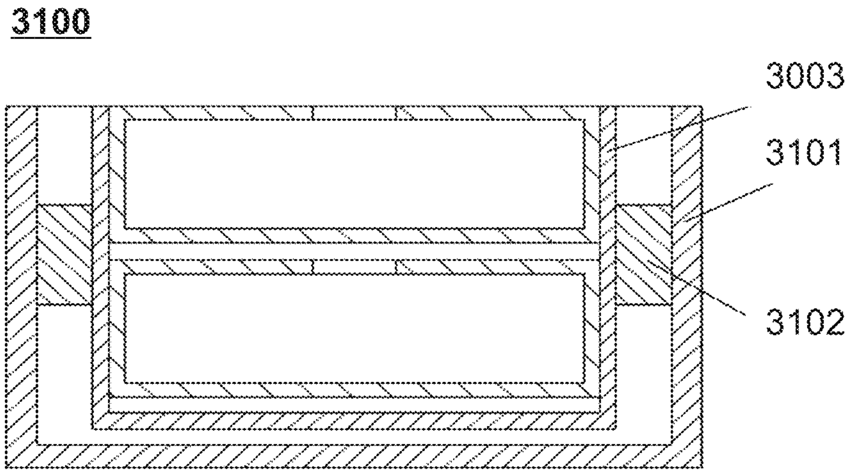
FIG. 31 is a schematic diagram illustrating a structure of a dual-microphone speaker according to some embodiments of the present disclosure.

FIG. 31 is a schematic diagram illustrating a structure of a speaker that contains the dual-microphone component in FIG. 30. As shown in FIG. 31, the speaker 3100 may include the dual-microphone assembly 3000, a housing 3101, and a connection structure 3102. The housing 3003 of components of the dual-microphone assembly 3000 may be connected to the housing 3101 through a peripheral connection. The peripheral connection may keep the two microphones in the dual-microphone assembly 3000 symmetrical with respect to the connection position on the housing 3101, thereby further ensuring that vibration transmission paths from the vibration source to the two microphones are the same. In some embodiments, the speaker structure in FIG. 31 may effectively eliminate influences of different transmission paths of vibration noises, different types of two microphones, etc. on removing the vibration noises.

Example 3

Figure 32:
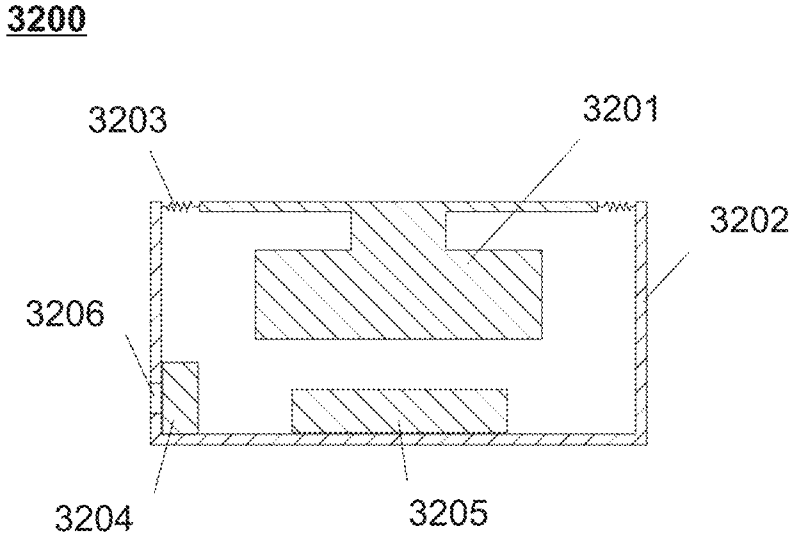
FIG. 32 is a schematic diagram illustrating a structure of a dual-microphone speaker according to some embodiments of the present disclosure.

FIG. 32 is a schematic diagram illustrating a structure of a dual-microphone speaker according to some embodiments of the present disclosure. As shown in FIG. 32, the speaker 3200 may include a vibration component 3201, a housing 3202, an elastic element 3203, an air conduction microphone 3204, a bone conduction microphone 3205, and an opening 3206. As used herein, the vibration component 3201 may be fixed on the housing 3202 through an elastic element 3203. The air conduction microphone 3204 and the bone conduction microphone 3205 may be respectively connected to different positions inside the housing 3202. The air conduction microphone 3204 may communicate with the outside air through the opening 3206 to receive air-conducted sound signals. When the vibration component 3201 vibrates and produces sound, the housing 3202 may be driven to vibrate, and the housing 3202 may transmit the vibration to the air conduction microphone 3204 and the bone conduction microphone 3205. In some embodiments, a signal processing method in FIG. 15B may be used to remove the vibration noise signal received by the air conduction microphone 3204 using the vibration signal obtained by the bone conduction microphone 3205. In some embodiments, the bone conduction microphone 3205 may be used to remove vibration noises of all communication frequency bands received by the air conduction microphone 3204.

Example 4

Figure 33:
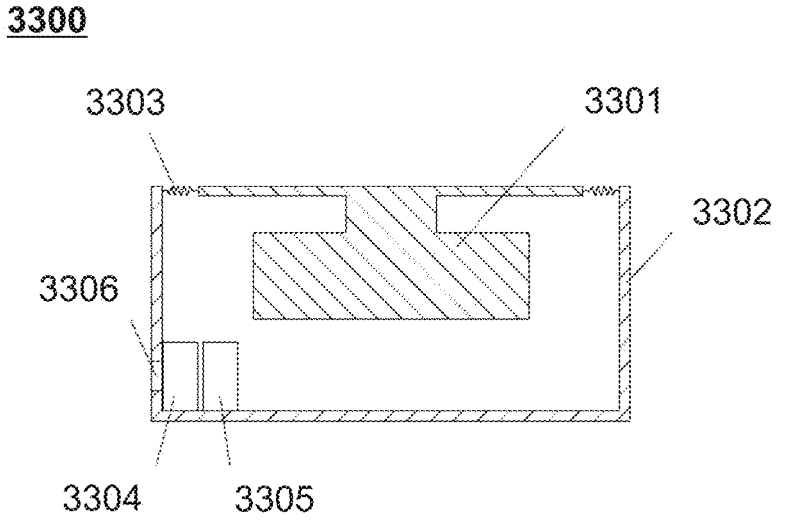
FIG. 33 is a schematic diagram illustrating a structure of a dual-microphone speaker according to some embodiments of the present disclosure.

FIG. 33 is a schematic diagram illustrating a structure of a dual-microphone speaker according to some embodiments of the present disclosure. As shown in FIG. 33, the speaker 3300 may include a vibration component 3301, a housing 3302, an elastic element 3303, an air conduction microphone 3304, a vibration sensor 3305, and an opening 3306. The vibration sensor 3305 may be a closed microphone, a dual-connected microphone, or a bone conduction microphone as shown in some embodiments of the present disclosure, or may be other sensor devices with a vibration signal collection function. The vibration component 3301 may be fixed to the housing 3302 through the elastic element 3303. The air conduction microphone 3304 and the vibration sensor 3305 may be two microphones with the same amplitude-frequency response and/or phase-frequency response after selection or adjustment. A top and a side of the air conduction microphone 3304 may be respectively connected to the inside of the housing 3302, and a side of the vibration sensor 3305 may be connected to the inside of the housing 3302. The air conduction microphone 3304 may communicate with the outside air through the opening 3306. When the vibration component 3301 vibrates, it may drive the housing 3302 to vibrate, and the vibration of the housing 3302 may be transmitted to the air conduction microphone 3304 and the vibration sensor 3305. Since a position where the air conduction microphone 3304 is connected to the housing 3302 is very close to a position where the vibration sensor 3305 is connected to the housing 3302 (e.g., the two microphones may be located at positions 1601 and 1602 in FIG. 16, respectively), the vibration transmitted to the two microphones by the housing 3302 may be the same. In some embodiments, the vibration noise signal received by the air conduction microphone 3304 may be removed using a signal processing method as shown in FIG. 15C based on the signals received by the air conduction microphone 3304 and the vibration sensor 3305. In some embodiments, the vibration sensor 3305 may be used to remove vibration noises in all communication frequency bands received by the air conduction microphone 3304.

Example 5

Figure 34:
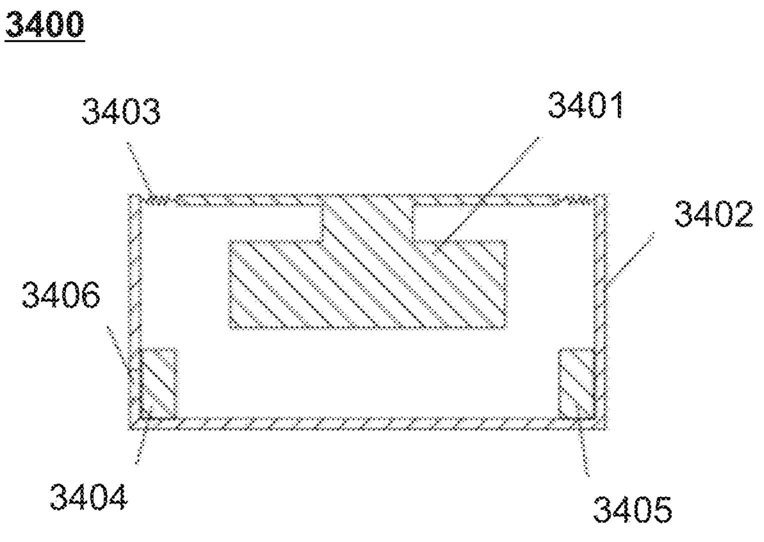
FIG. 34 is a schematic diagram illustrating a structure of a dual-microphone speaker according to some embodiments of the present disclosure.

FIG. 34 is a schematic diagram illustrating a structure of a dual-microphone speaker according to some embodiments of the present disclosure. The dual-microphone speaker 3400 may be another variant of the speaker 3300 in FIG. 33. The speaker 3400 may include a vibration component 3401, a housing 3402, an elastic element 3403, an air conduction microphone 3404, a vibration sensor 3405, and an opening 3406. The vibration sensor 3405 may be a closed microphone, a dual-link microphone, or a bone conduction microphone. The air conduction microphone 3404 and the vibration sensor 3405 may be respectively connected to the inner side of the housing 3402 through a peripheral connection, and may be symmetrically distributed with respect to the vibration component 3401 (e.g., the two microphones may be respectively located at positions 1601 and 1604 in FIG. 16). The air conduction microphone 3404 and the vibration sensor 3405 may be two microphones with the same amplitude-frequency response and/or phase-frequency response after selection or adjustment. In some embodiments, the vibration noise signal received by the air conduction microphone 3404 may be removed using the signal processing method shown in FIG. 15C based on the signals received by the air conduction microphone 3404 and the vibration sensor 3405. In some embodiments, the vibration sensor 3405 may be used to remove vibration noises in all communication frequency bands received by the air conduction microphone 3404.

The embodiments described above are merely implements of the present disclosure, and the descriptions may be specific and detailed, but these descriptions may not limit the present disclosure. It should be noted that those skilled in the art, without deviating from concepts of the bone conduction speaker, may make various modifications and changes to, for example, the sound transfer approaches described in the specification, but these combinations and modifications are still within the scope of the present disclosure.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A speaker, comprising:

a housing;

a transducer residing inside the housing and configured to generate vibrations, the vibrations producing a sound wave inside the housing and causing a leaked sound wave spreading outside the housing from a portion of the housing;

at least one sound guiding hole located on the housing and configured to guide the sound wave inside the housing through the at least one sound guiding hole to an outside of the housing, the guided sound wave having a phase different from a phase of the leaked sound wave, the guided sound wave interfering with the leaked sound wave in a target region, and the interference reducing a sound pressure level of the leaked sound wave in the target region;

a microphone configured to receive a first signal including a voice signal and a first vibration signal; and a vibration sensor configured to receive a second vibration signal, wherein the microphone and the vibration sensor are configured such that the first vibration signal can be offset with the second vibration signal.

2. The speaker of claim 1, the first vibration signal and the second vibration signal originating from a vibration of a vibration source.

3. The speaker of claim 1, wherein an amplitude-frequency response of the vibration sensor to the second vibration signal is the same as an amplitude-frequency response of the microphone to the first vibration signal; or a phase-frequency response of the vibration sensor to the second vibration signal is the same as a phase-frequency response of the microphone to the first vibration signal.

4. The speaker of claim 1, wherein a cavity volume of the vibration sensor is larger than a cavity volume of the microphone such that the microphone and the vibration sensor have an approximately same frequency response to the vibration of the vibration source.

5. The speaker of claim 4, wherein a ratio of the cavity volume of the vibration sensor to the cavity volume of the microphone is in a range of 3:1 to 6.5:1.

6. The speaker of claim 1, wherein the microphone includes a front cavity or a back cavity.

7. The speaker of claim 6, wherein the front cavity includes at least one opening on a top or a side wall of the front cavity.

8. The speaker of claim 1, wherein the vibration sensor includes at least one of a closed microphone, or a dual-link microphone.

9. The speaker of claim 8, wherein the closed microphone has a closed front cavity and a closed back cavity.

10. The speaker of claim 8, wherein the dual-link microphone has an open front cavity and an open back cavity.

11. The speaker of claim 1, wherein the microphone is an air conduction microphone and the vibration sensor is a bone conduction microphone.

12. The speaker of claim 1, wherein the microphone and the vibration sensor are both micro-electromechanical system microphones.

13. The speaker of claim 1, wherein the microphone and the vibration sensor are independently connected to the housing.

14. The speaker of claim 13, wherein the microphone and the vibration sensor are located at adjacent positions on the housing or at symmetrical positions on the housing with respect to the speaker.

15. The speaker of claim 13, wherein a connection between the microphone and the housing or a connection between the vibration sensor and the housing includes a cantilever connection, a peripheral connection, or a substrate connection.

16. The speaker of claim 1, wherein the at least one sound guiding hole includes a damping layer, the damping layer being configured to adjust the phase of the guided sound wave in the target region.

17. The speaker of claim 16, wherein the damping layer includes at least one of a tuning paper, a tuning cotton, a nonwoven fabric, a silk, a cotton, a sponge, or a rubber.

18. The speaker of claim 1, wherein the guided sound wave includes at least two sound waves having different phases.

19. The speaker of claim 18, wherein the at least one sound guiding hole includes two sound guiding holes located on the housing.

20. The speaker of claim 19, wherein the two sound guiding holes are arranged to generate the at least two sound waves having different phases to reduce the sound pressure level of the leaked sound wave having different wavelengths.

* * * * *